(12) United States Patent
Singhal et al.

(10) Patent No.: US 12,725,324 B2
(45) Date of Patent: Sep. 1, 2026

(54) VECTOR PATH TRAJECTORY IMITATION

(71) Applicant: Adobe Inc., San Jose, CA (US)

(72) Inventors: Gagan Singhal, New Delhi (IN); Shikhar Tayal, Aligarh (IN); Nilesh Mishra, Kanpur (IN)

(73) Assignee: Adobe Inc., San Jose, CA (US)

( * ) Notice: Subject to any disclaimer, the term of this patent is extended or adjusted under 35 U.S.C. 154(b) by 189 days.

(21) Appl. No.: 18/483,919

(22) Filed: Oct. 10, 2023

(65) Prior Publication Data

US 2025/0117989 A1 Apr. 10, 2025

(51) Int. Cl.
*G06T 11/23* (2026.01)
*G06V 10/46* (2022.01)

(52) U.S. Cl.
CPC ............ *G06T 11/23* (2026.01); *G06V 10/469* (2022.01)

(58) Field of Classification Search
CPC ............................ G06T 11/203; G06V 10/469
See application file for complete search history.

(56) References Cited

U.S. PATENT DOCUMENTS 10,152,213 B2 * 12/2018 Bedi ..................... G06F 3/0488
10,620,531 B1 * 4/2020 Jaklic ........................ G03F 1/70
10,930,033 B1 * 2/2021 Peterson ............. G06F 3/04842
2018/0255428 A1 * 9/2018 Bagchi .................. H04L 67/535

FOREIGN PATENT DOCUMENTS

CN 106313007 A * 1/2017 ............ B25J 9/0081
CN 113763481 A * 12/2021 ............. G06T 17/05
WO WO-2009111139 A1 * 9/2009 ........... G01N 23/207

OTHER PUBLICATIONS

Aflak, Omar , "Bézier Interpolation", Medium [retrieved Jul. 11, 2023]. Retrieved from the Internet <https://towardsdatascience.com/b%C3%A9zier-interpolation-8033e9a262c2>., May 9, 2020, 10 Pages.
Baran, Ilya , et al., "Sketching Clothoid Splines Using Shortest Paths", Computer Graphics Forum, vol. 29, No. 2 [retrieved Jul. 11, 2023]. Retrieved from the Internet <http://citeseerx.ist.psu.edu/viewdoc/download?doi=10.1.1.156.3602&rep=rep1&type=pdf>., Jun. 7, 20210, 15 pages.

* cited by examiner

*Primary Examiner* — Said Broome
*Assistant Examiner* — Denis Vasiliy Minko
(74) *Attorney, Agent, or Firm* — FIG. 1 Patents

(57) ABSTRACT

An example vector path trajectory imitation system is configured to create a new vector path or to extend an existing vector path based on a reference. In this manner, a user (e.g., artist, illustrator, or designer) does not need to tweak individual anchor points to align a trajectory of the new vector path with the trajectory of the reference. Instead, the user moves a position indicator (e.g., a mouse cursor) on a digital canvas in a freehand fashion while the vector path trajectory imitation system provides visual feedback to show the user how a resultant curve will look. When the user reaches a position on the digital canvas where a new vector path is to be drawn, the user can perform an action (e.g., releasing a mouse button) and the new vector path, which follows the trajectory of the reference, is created.

20 Claims, 22 Drawing Sheets

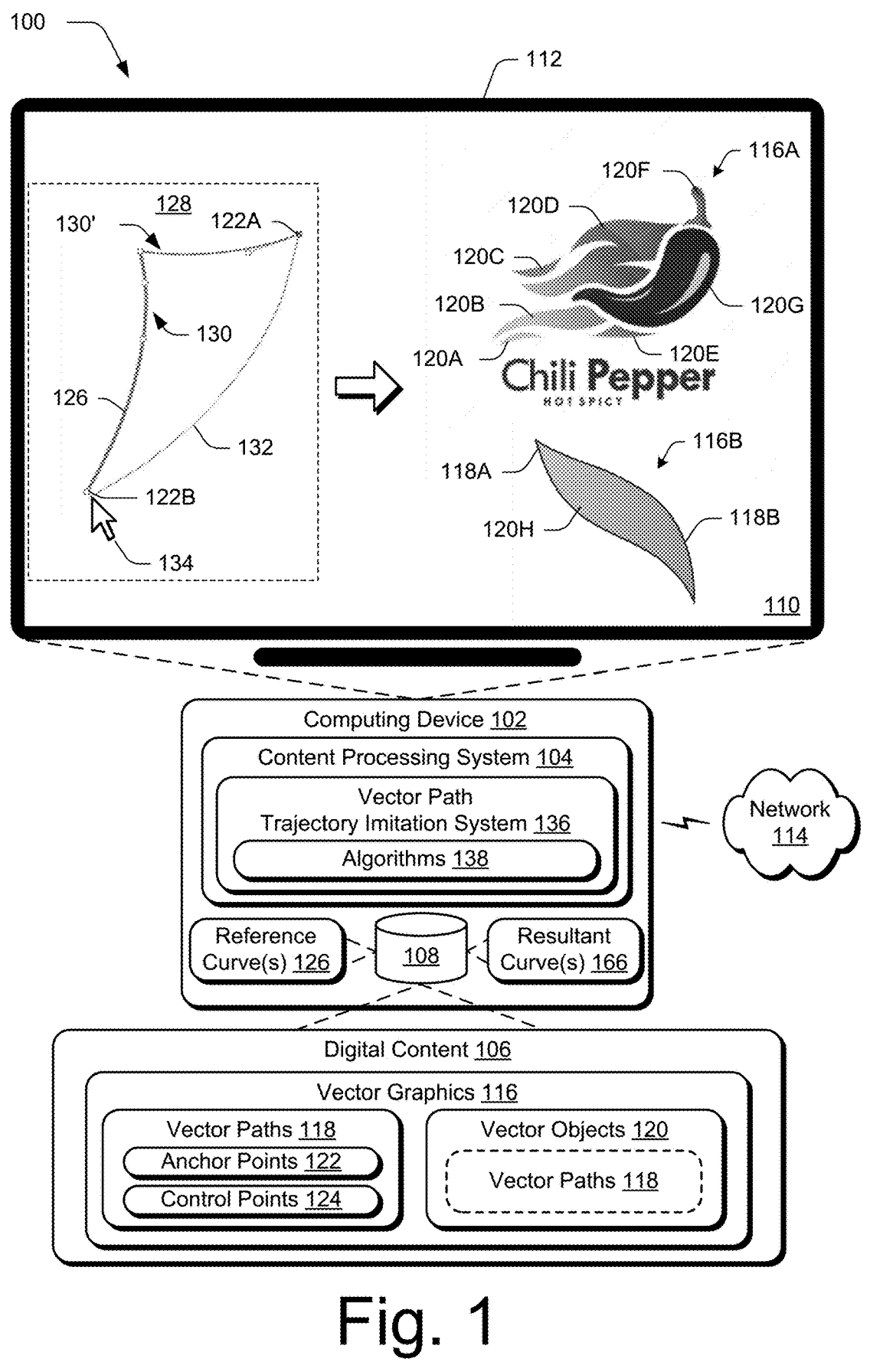

100

112

128

130'

122A

130

126

132

122B

134

116A

120F

120D

120C

120B

120G

120A

120E

Chili Pepper

HOT SPICY

116B

118A

120H

118B

110

Computing Device 102

Content Processing System 104

Vector Path Trajectory Imitation System 136

Algorithms 138

Network 114

Reference Curve(s) 126

108

Resultant Curve(s) 166

Digital Content 106

Vector Graphics 116

Vector Paths 118

Anchor Points 122

Control Points 124

Vector Objects 120

Vector Paths 118

Fig. 1

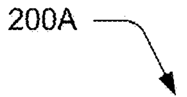
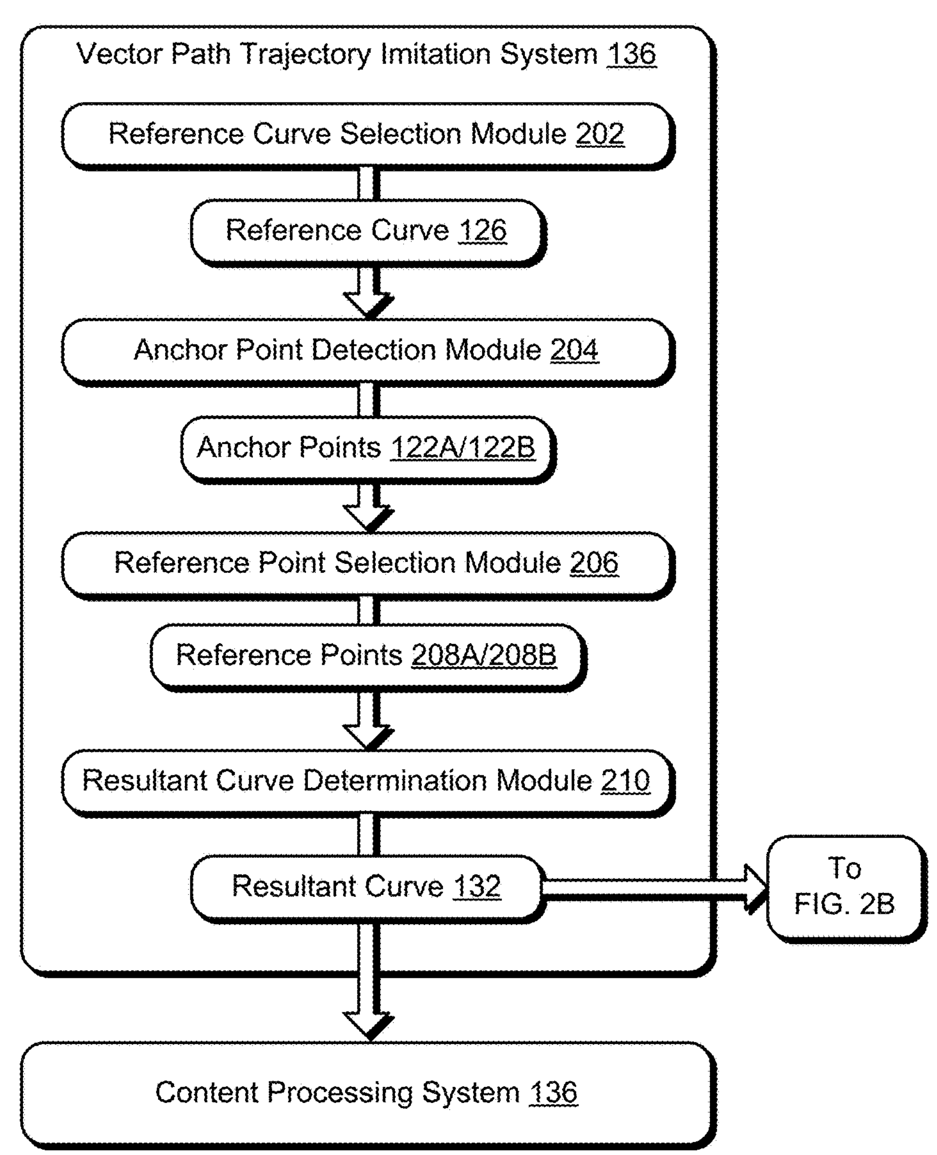
Fig. 2A

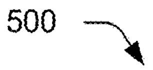
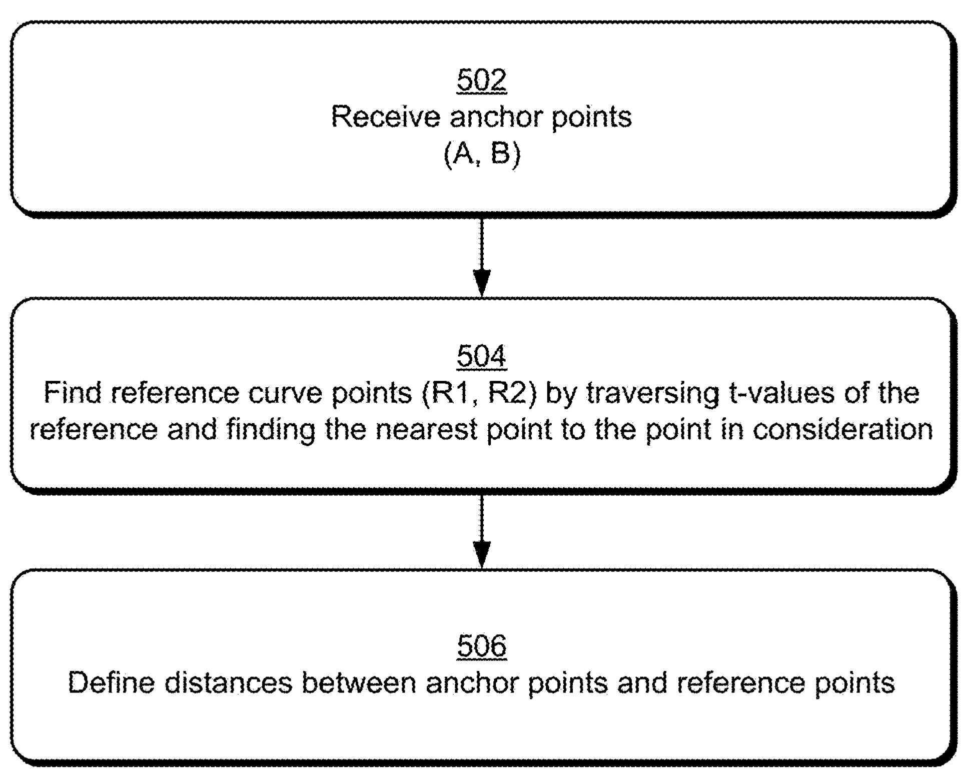
Fig. 5

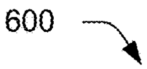
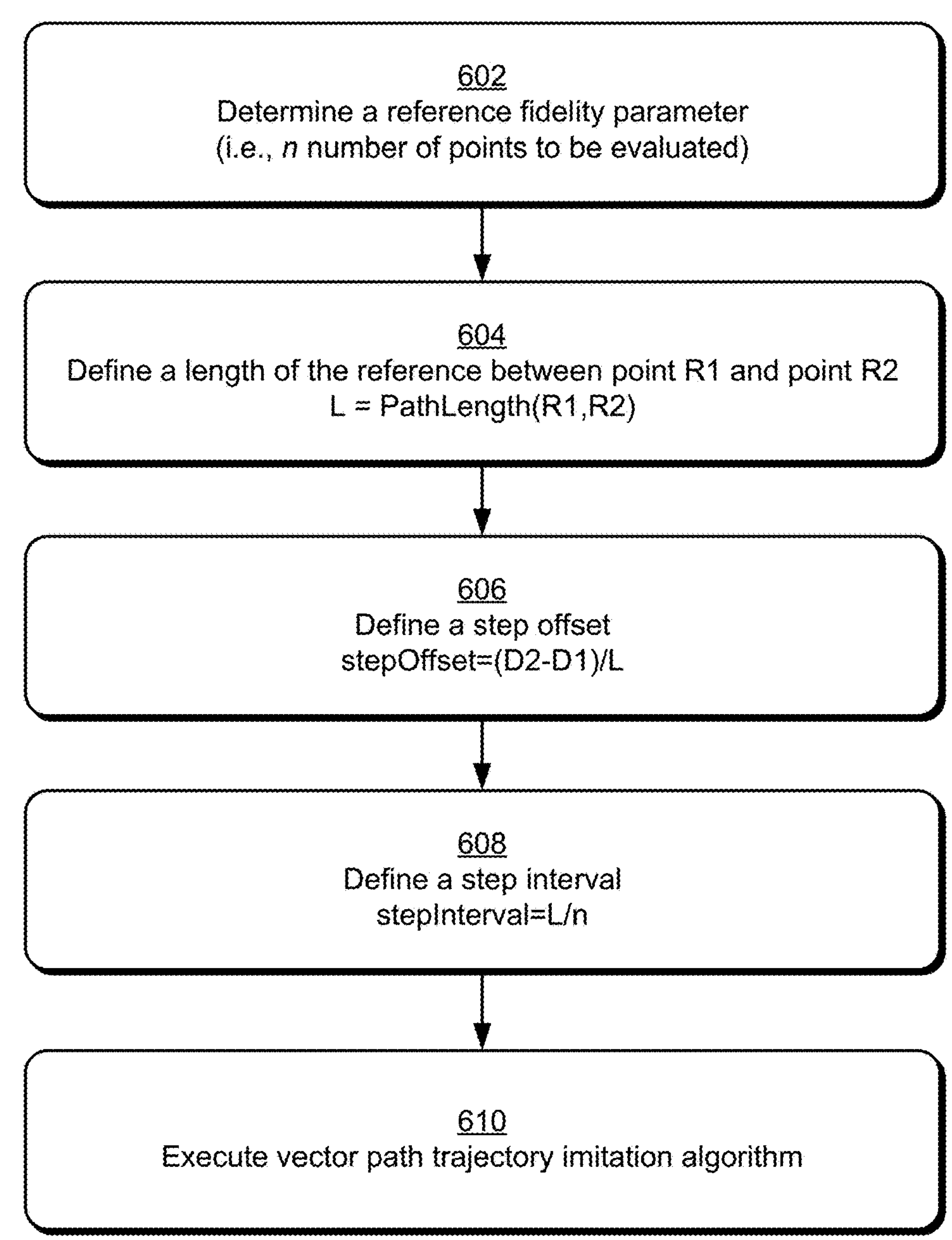
Fig. 6

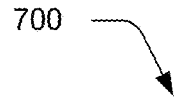

Algorithm 1: Candidate Curve Points

Data: $D1$, $D2$, $stepOffset$, $stepInterval$

Result: Returns vector of paired points, each pair corresponds to a point on the reference curve and a point on the resultant curve desired begin

$curvePairArray \longleftarrow$ empty vector of paired points foreach $i \in [1, n]$ do

$moveDistance \longleftarrow (stepInterval * i)$ $offsetDistance \longleftarrow D1 + (stepOffset * moveDistance)$ $P1 \longleftarrow$ point on reference art at a distance of $R1 + moveDistance$ $NV \longleftarrow$ unit normal vector at point P1

$P2 = P1 + (offsetDistance * NV)$ $curvePairArray \longleftarrow$ Append (P1, P2)

return curvePairArray

Fig. 7

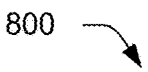
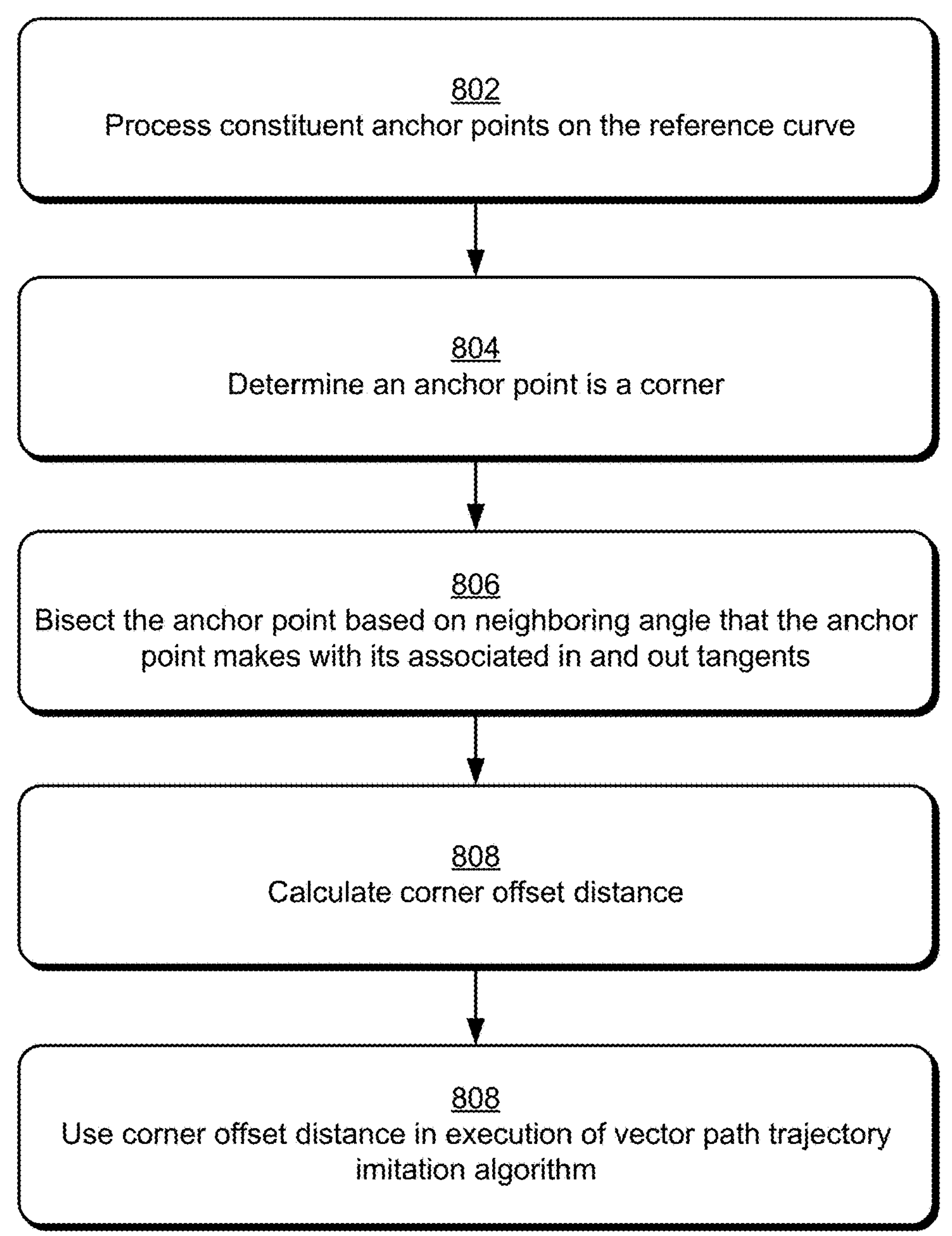
Fig. 8

Figure 10B:
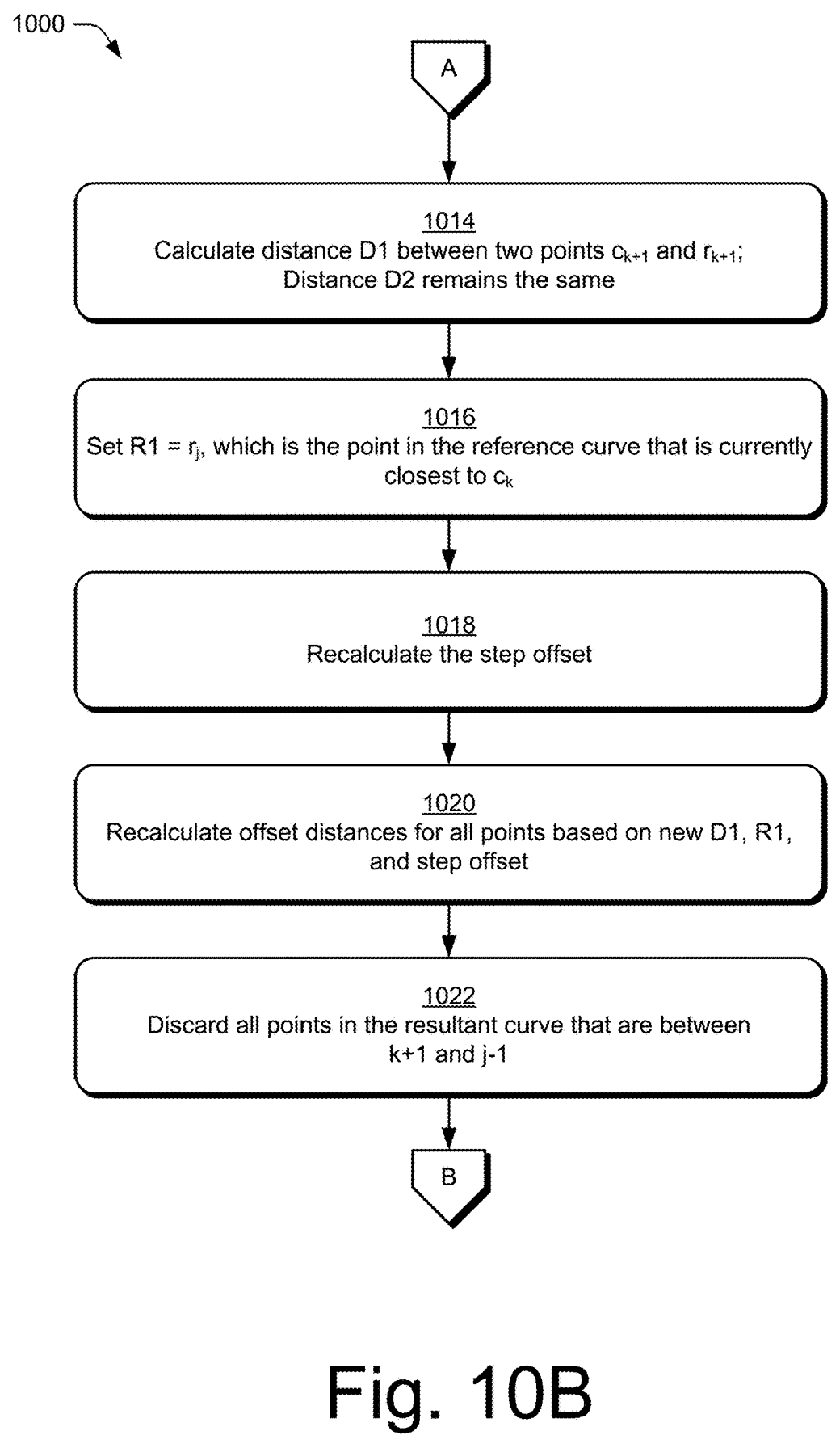

1000

A

1014
Calculate distance D1 between two points $c_{k+1}$ and $r_{k+1}$;
Distance D2 remains the same 1016
Set R1 = $r_j$, which is the point in the reference curve that is currently closest to $c_k$ 1018
Recalculate the step offset 1020
Recalculate offset distances for all points based on new D1, R1, and step offset 1022
Discard all points in the resultant curve that are between k+1 and j-1

VECTOR PATH TRAJECTORY IMITATION

BACKGROUND

Vector graphics are digital images defined by geometric primitives and mathematical constructs, rather than a discrete grid of pixels used in raster graphics. A key attribute of vector graphics is inherent scalability. Regardless of the scale at which a vector image is viewed or printed, vector images retain precision and do not exhibit pixelation, which is a limitation observed in raster images. Vector images are encapsulated in formats such as scalable vector graphics (SVG) or Adobe® Illustrator® Artwork (AI). Unlike raster formats that store pixel values, vector formats store the mathematical instructions for rendering the image, resulting in efficient file storage. The modifiable nature of these mathematical representations allows for element-level adjustments post-creation. However, for display on pixel-based devices (e.g., computer monitors, televisions, and digital printers), a conversion process known as rasterization is employed, in which vector data is mapped onto a discrete pixel grid.

In vector graphics, a vector path is a fundamental concept that represents a sequence of points in a particular order, connected by straight lines, curves, or both. A vector path can have multiple segments, and each of the segments can be a straight line, a Bézier curve, or another type of curve. When a segment of a vector path is designed as a Bézier curve, the segment utilizes both anchor points and control points. Anchor points represent the start and end points of a curve segment. Control points are used to guide the curvature of the curve segment. Bézier curves can be simple, controlled by two anchor points and one control point (i.e., quadratic Bézier curves), or more complex, controlled by two anchor points and multiple control points (i.e., cubic Bézier curves).

Conventional software tools enable artists to create cubic Bézier curves for digital artwork. Even with these tools, a process for creating Bézier curves is lengthy and tedious. This is because the artist is tasked with carefully configuring each anchor point and each control point of a cubic Bézier curve to achieve a desired curve.

SUMMARY

Techniques and systems for imitating vector path trajectories are described. An example vector path trajectory imitation system is configured to create a vector path or to extend an existing vector path based on a reference, such as another vector path or a selected portion of another vector path or the selected portion of the existing vector path. In this manner, a user (e.g., artist, illustrator, or designer) is not confronted with tweaking individual anchor points to align a trajectory of an input vector path with the trajectory of a reference vector path. Instead, the user moves a position indicator (e.g., via a cursor control device) on a digital canvas in a freehand fashion while the vector path trajectory imitation system provides visual feedback to indicate how the resultant accumulation of Bézier curves will look. When a position is reached on the digital canvas where the vector path is to be drawn, an input is received (e.g., releasing a mouse button) and the new vector path which follows the trajectory of the reference is created.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ vector path trajectory imitation techniques described herein.

FIGS. 2A, 2B depict a system in an example implementation showing operation of a vector path trajectory imitation system of FIG. 1 in greater detail.

FIG. 5 is a flow diagram depicting a step-by-step procedure in an example implementation of operations performable by a processing device for accomplishing a result of selecting reference curve points along a reference curve.

FIG. 6 is a flow diagram depicting a step-by-step procedure in an example implementation of operations performable by a processing device for accomplishing a result of calculating a resultant curve.

FIG. 7 is an example vector path trajectory imitation algorithm used to find candidate curve points.

FIG. 8 is a flow diagram depicting a step-by-step procedure in an example implementation of operations performable by a processing device for accomplishing a result of handling corners in resultant curves.

FIGS. 10A, 10B are a flow diagram depicting a step-by-step procedure in an example implementation of operations performable by a processing device for accomplishing a result of refining an output of a resultant curve determination module to mitigate or eliminate unintentional loop artifacts.

FIG. 17 is an illustration of several example outputs of the vector path trajectory imitation system.

DETAILED DESCRIPTION

Overview

Figure 2B:
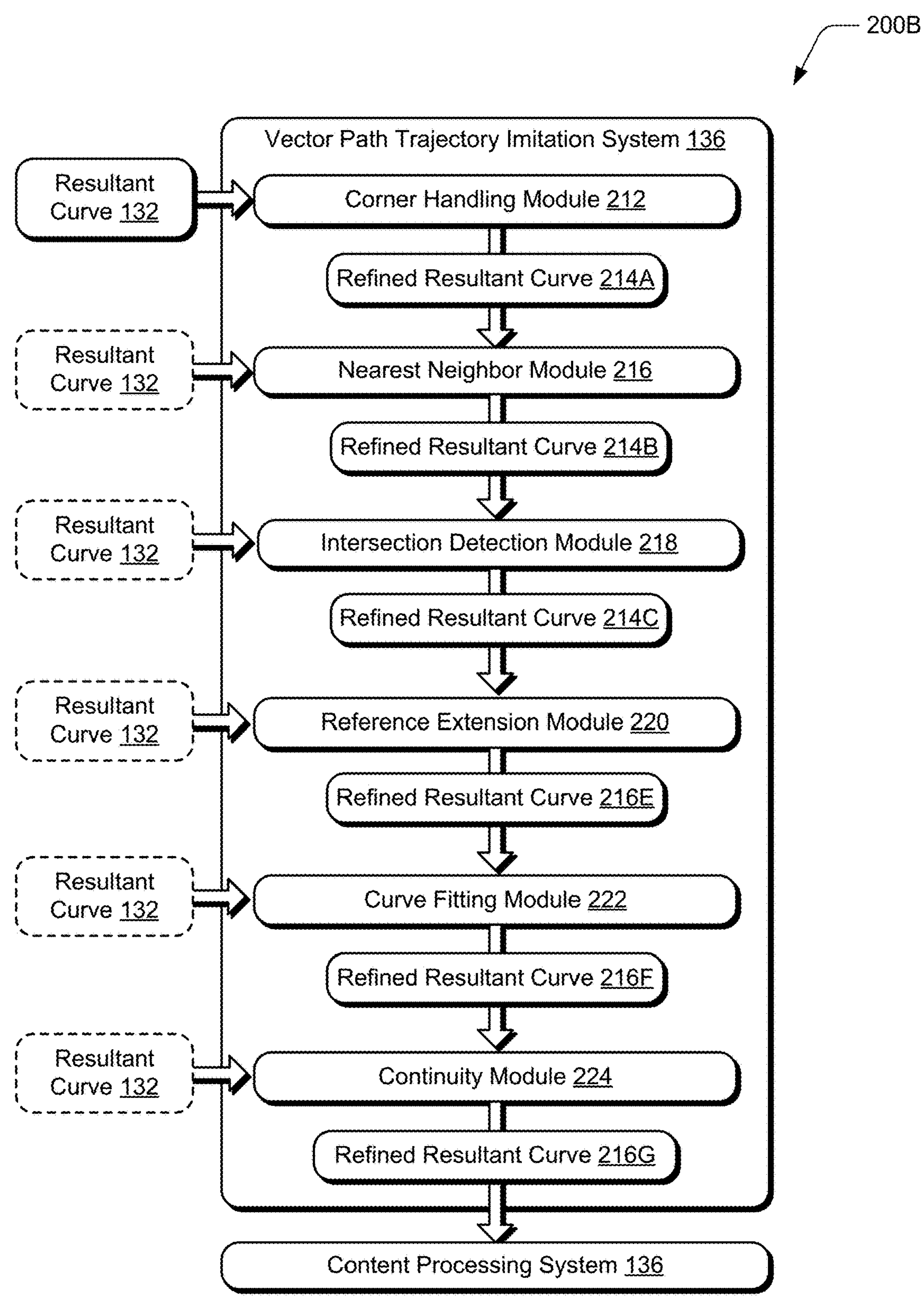
Figure 3:
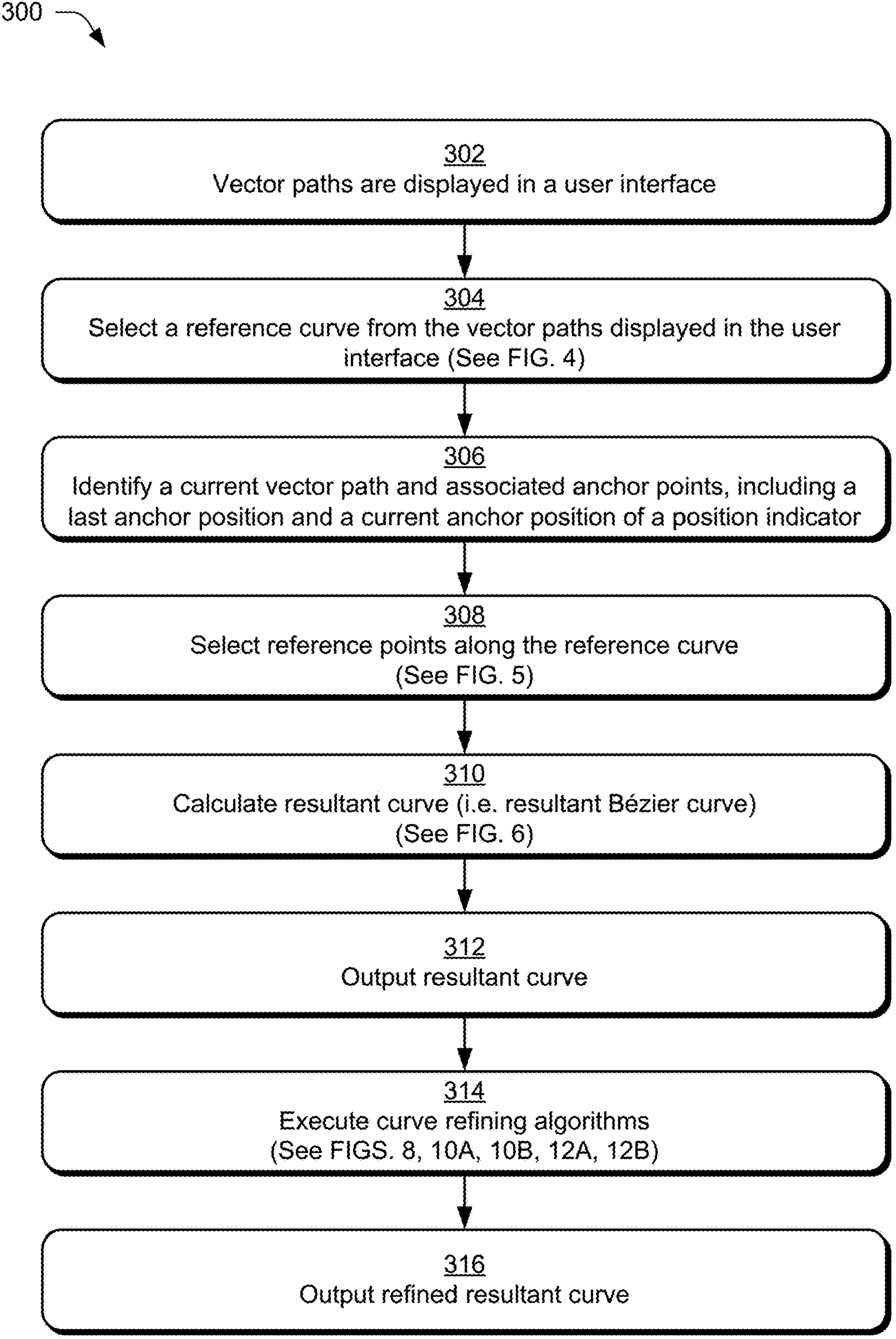
FIG. 3 is a flow diagram depicting a step-by-step procedure in an example implementation of operations performable by a processing device for accomplishing a result of generating a resultant curve from a reference curve and refining the resultant curve using one or more curve refining algorithms.

Vector graphics software provides tools to create and edit vector paths. One such tool enables a user (e.g., artist, designer, or illustrator) to automatically offset vector paths by a constant distance. This saves the user time and ensures consistent distances between vector paths, which supports precise and symmetrical artwork. Artwork, however, is rarely precise and symmetrical. Oftentimes, a desirable visual appearance of the artwork is achieved when different edges each have their own trajectories that correspond to other trajectories but not in an exacting fashion.

Conventional vector graphics software also provides anchor tools that allow users to manipulate vector paths to create precise cubic Bézier curves one at a time. However, manually creating a sequence of cubic Bézier curves and attempting to loosely match the trajectory of the cubic Bézier curves is an acquired skill that even experienced users find time-consuming. Newer users are often resistant to learning such skills, instead relying on software to provide faster and more intuitive solutions.

To address these and other technical challenges, a vector path trajectory imitation system is described that is configured to create a new vector path or to extend an existing vector path based on a reference, such as another vector path or a selected portion of another vector path. In this manner, a user (e.g., artist, illustrator, or designer) is not tasked with manually adjusting individual anchor points to align a trajectory of the new vector path with the trajectory of the reference. Instead, a position indicator (e.g., a mouse cursor) is moveable with respect to a digital canvas in a freehand fashion while the vector path trajectory imitation system provides visual feedback indicating how the resultant accumulation of Bézier curves will look. When a position on the digital canvas where the new vector path is to be drawn is reached, an input is received (e.g., releasing a mouse button) and the new vector path which follows the trajectory of the reference is created.

According to some examples, vector paths are displayed in a user interface (e.g., a digital canvas) of a content processing system. The vector path trajectory imitation system then detects an input to select a reference from the vector paths displayed in the user interface. The vector path trajectory imitation system also detects an input of two locations in the user interface between which the vector path trajectory imitation system is configured to imitate a reference trajectory of the reference. The first of these locations (referred to as "point A") is the last anchor location of the vector path which is currently being drawn by the user. The second of these locations (referred to as "point B") is the current location of a position indicator (e.g., a mouse cursor). The vector path trajectory imitation system executes a vector path trajectory imitation algorithm to imitate the trajectory of the selected reference. When the vector path trajectory imitation system detects a change in the position indicator (e.g., the mouse hover position changes), the vector path trajectory imitation system re-executes the vector path trajectory imitation algorithm.

The techniques described herein significantly reduces the time it takes to complete digital artwork, thereby improving operation of computing devices that implement these techniques, reducing power consumption, and improving user efficiency in navigating through tools supported by the system. The vector path trajectory imitation system can imitate trajectories of all lengths, efficiently creating any number of anchor points in a single mouse click or equivalent interaction as opposed to creating and tweaking each anchor point separately.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Vector Path Trajectory Imitation Environment

FIG. 1 is an illustration of an environment 100 in an example implementation that is operable to employ vector path trajectory imitation techniques described herein. The illustrated environment 100 includes a computing device 102, which is configurable in a variety of ways.

The computing device 102, for instance, is configurable as a desktop computer, a laptop computer, a mobile device, and so forth. Thus, the computing device 102 ranges from full resource devices with substantial memory and processor resources (e.g., personal computers and game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 19.

The computing device 102 is illustrated as including a content processing system 104. The content processing system 104 is implemented at least partially in hardware of the computing device 102 to process and transform digital content 106, which is illustrated as maintained in a storage device 108 of the computing device 102. Such processing includes creation of the digital content 106, modification of the digital content 106, and rendering of the digital content 106 in a user interface 110 for output, for example, by a display device 112. Examples of digital content 106 include digital documents, digital images, digital media, digital illustrations, and so forth. Although illustrated as implemented locally at the computing device 102, functionality of the content processing system 104 is also configurable in whole or part via functionality available via a network 114, such as part of a web service or "in the cloud."

The digital content 106 can be or can include one or more vector graphics 116. For example, the digital content 106 can be artwork, such as a logo, that contains one or more vector graphics 116. The vector graphics 116 are created based on mathematical equations. In the illustrated example, the vector graphics 116 are created from one or more vector paths 118 that form one or more vector objects 120.

The vector paths 118 are sequences of points in a particular order connected by straight lines, curves (e.g., Bézier curves), or a combination of both. The vector paths 118 can be either open or closed. A vector object 120 may be formed by a single closed vector path 118, such as is the case for simple shapes. The vector paths 118 can have properties, such as stroke color, width, and pattern. A closed vector path 118 may also have a fill property. The vector paths 118, especially those with Bézier curves, offer immense flexibility in designing the digital content 106. The vector paths 118 allow for precision in shaping and manipulation, enabling users to create anything from simple geometric designs to intricate artwork.

The vector paths 118 are controlled by anchor points 122 and control points 124. The anchor points 122 represent the start and end points of the vector paths 118. The control points 124 determine the curvature of the vector paths 118 that form Bézier curves. The disclosed techniques are described in context of the vector paths 118 being formed, at least in part, from Bézier curves. More particularly, the vector paths 118 are formed from cubic Bézier curves which are controlled by two anchor points 122 and multiple control points 124.

The vector objects 120 are distinct, self-contained shapes or forms in the vector graphics 116. The vector objects 120 are created by enclosing a series of points with the vector paths 118. The vector objects 120 can have various properties, such as fill color, stroke color, stroke width, gradients, patterns, and the like. The vector objects 120 can be simple shapes such as circle or rectangle, or more complex freeform shapes that represent detailed illustrations or intricate designs of individual vector graphics 116 or the digital content 106 as a whole. The vector objects 120 can be scaled, rotated, skewed, transformed, or otherwise manipulated without any loss in clarity or quality.

In the illustrated example, the digital content 106 displayed in the user interface 110 includes two examples of the vector graphics 116. A first vector graphic 116A is a vector-based logo that includes an illustration of chili pepper and fire. A second vector graphic 116B is a freeform shape. Each of the vector graphics 116A, 116B is composed of multiple vector objects 120. For example, the first vector graphic 116A is composed of vector objects 120A-120E that together depict the fire and vector objects 120F-120G that together depict the chili pepper. The second vector graphic 116B is composed of a single vector object 120H. Each of the vector objects 120A-120H is composed of one or more vector paths 118. For example, the vector object 120H is composed of vector paths 118A, 118B. The vector paths 118 of the vector objects 120A-120H are numerous and not individually labeled for ease of reading.

Both of the vector graphics 116A, 116B can be created, at least in part, from a reference curve 126 that is already drawn in the user interface 110. The reference curve 126 can be one of the vector paths 118 or a selected portion of one of the vector paths 118. In the illustrated example, a candidate reference space 128 is shown in which candidate references 130, 130' (i.e., candidates to be selected as the reference curve 126) have been drawn. Specifically, the leftmost curve is shown as the candidate reference 130 and the upper curve is shown as the candidate reference 130'. The candidate reference space 128 can be the entirety of the user interface 110 such that a user can select the reference curve 126 from any of the vector paths 118 currently displayed in the user interface 110. Alternatively, the candidate reference space 128 can be a portion of the user interface 110 such as shown in the illustrated example. Moreover, although the illustrated example shows the candidate reference space 128 as a dotted line to aid in visualizing the above concepts, in real-world implementations, the candidate reference space 128 may be hidden from the user or not utilized at all. It is contemplated that a dotted line or other way to visually differentiate between a portion of the user interface 110 that is considered the candidate reference space 128 from the remainder of the user interface 110 can be toggled on/off (e.g., on-the-fly by the user or automatically based on a preference).

Inside the illustrated candidate reference space 128, a user input is received via the user interface 110 as selecting the candidate reference 130 (i.e., the leftmost curve) as the reference curve 126. The candidate reference space 128 also depicts two locations in the user interface 110 between which a resultant curve 132 having a similar or the same trajectory as the reference curve 126 is created. These locations are shown as anchor point A 122A and anchor point B 122B. Anchor point A 122A is the last anchor location of the resultant curve 132 which is currently being drawn in the user interface 110. Anchor point B 122B is the current location of a position indicator 134. In the illustrated example, the position indicator 134 is a mouse cursor and the anchor point B 122B represents a current mouse hover position. The position indicator 134 may be a touch point or other indicator of the position of a user's interaction with the user interface 110. As the position indicator 134 moves around the user interface 110, the anchor point B 122B changes and the resultant curve 132 is recreated.

An example of functionality incorporated by the content processing system 104 to process the digital content 106 is illustrated as a vector path trajectory imitation system 136. The vector path trajectory imitation system 136 is configurable to execute one or more algorithms 138 to perform various operations described herein. For example, the algorithms 138 include a vector path trajectory imitation algorithm usable to create the resultant curve 132 from the reference curve 126, and one or more curve refining algorithms to refine the curvature of the resultant curve 132, such as to mitigate or eliminate undesirable characteristics of the resultant curve 132.

By implementing the vector path trajectory imitation system 136, user inputs may be avoided as involved in conventional systems that involve manual modifications to individual anchor points 122 (e.g., the anchor point A 122A and the anchor point B 122B) to align the trajectory of the resultant curve 132 with the trajectory of the reference curve 126. Instead, as introduced above, the user moves the position indicator 134 in the user interface 110 in a freehand fashion while the vector path trajectory imitation system 136 provides visual feedback to show how the resultant curve 132 will look.

When a position in the user interface 110 is reached, at which, a resultant curve 132 is to be drawn (e.g., an edge of a vector object 120), an action is performable (e.g., releasing a mouse button) and the resultant curve 132, which follows the trajectory of the reference curve 126, is created. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Vector Path Trajectory Imitation

The following discussion describes vector path trajectory imitation techniques that are implementable utilizing the described systems and devices. Aspects of procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out one or more algorithm as illustrated by the flow diagrams. As a result, the instructions are storable on a computer-readable storage medium that causes the hardware to perform the algorithms. In portions of the following discussion, reference will be made in parallel among FIGS. 2A, 2B, 3-6, 8, 10A, 10B, 12A, and 12B which together depict example systems and various step-by-step procedures in example implementations of operations performable for accomplishing vector path trajectory imitation.

FIG. 2A depicts a system 200A in an example implementation showing operation of the vector path trajectory imitation system 136 of FIG. 1 in greater detail. To begin, in FIG. 3, one or more vector paths 118 are displayed in a user interface 110 (block 302). In some implementations, each vector path 118 added to the user interface 110 is available as a candidate reference 130. The candidate reference(s) 130 may be displayed within a candidate reference space 128 as shown in FIG. 1, although other instances are also contemplated. The candidate reference(s) 130 can be or can include vector paths 118 drawn on or otherwise placed (e.g., via a copy-paste or drag-and-drop operation) in the user interface 110 via a user input. As such, the vector path(s) 118 can be created on-the-fly or derived from previous artwork displayed in the user interface 110.

Figure 4:
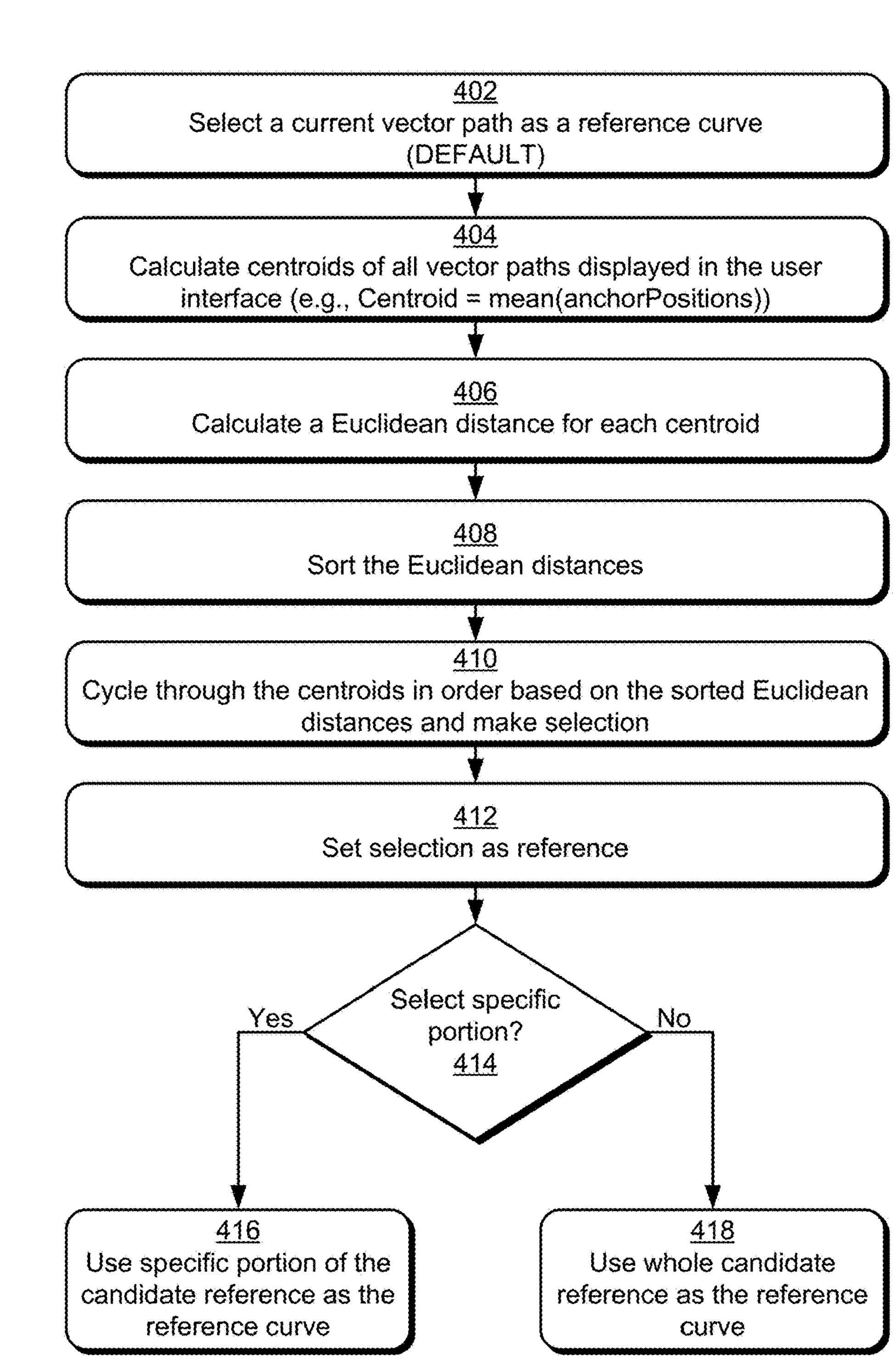
FIG. 4 is a flow diagram depicting a step-by-step procedure in an example implementation of operations performable by a processing device for accomplishing a result of selecting a reference curve from vector paths displayed in a user interface.

A reference selection module 202 is then employed to select a reference curve 126 from the candidate reference(s) 130 (block 304). FIG. 4 describes an example algorithm 400 performed by the reference selection module 202 to select the reference curve 126. In particular, as a default operation, the reference selection module 202 selects a current vector path (i.e., the vector path currently being drawn) as the reference curve 126 (block 402). The reference selection module 202 can stop here and use the current vector path as the reference curve 126. Oftentimes, however, the user interface 110 has multiple candidate references 130 from which to select the reference curve 126, in which case the reference selection module 202 can proceed as described below.

The reference selection module 202 calculates centroids of the vector paths 118 displayed in the user interface 110 or specifically within the candidate reference space 128 as the case may be (block 404). A centroid is the mean of the anchor points 122 for each of the vector paths 118. Equation 1 below can be used to calculate the centroids, where anchorPositions are the anchor points 122.

$$\text{Centroid} = \text{mean}(\mathit{anchorPositions}) \qquad \text{Equation 1}$$

After calculating the centroids of the vector paths 118 displayed in the user interface 110, the reference selection module 202 calculates the Euclidean distances between the anchor point A 122A and the corresponding centroid for each of the centroids (block 404). Equation 2 below can be used to calculate these Euclidean distances ($D_i$). The reference selection module 202 then sorts $D_i$ (block 408).

$$D_i = D(A, C_i) \qquad \text{Equation 2}$$

The user can cycle through the $i^{th}$ centroids in the order determined at block 408 and select one of the centroids (block 410). The reference selection module 202 then sets the selected centroid as a candidate reference (block 412). For example, a key or key combination can be used to cycle through the $i^{th}$ centroids, although other user input to perform this action is contemplated.

After the reference curve 126 has been selected, the reference selection module 202 determines whether a specific portion of the candidate reference has been selected (block 414). If so, the reference selection module 202 uses the specific portion of the candidate reference as the reference curve 126. If not, the reference selection module 202 uses the whole candidate reference as the reference curve 126 (block 418).

Returning to FIGS. 2A and 3, the reference selection module 202 provides the reference curve 126 to an anchor point detection module 204. The anchor point detection module 204 identifies a current vector path (i.e., the vector path currently being drawn) and associated anchor points, including a last anchor point of the current vector path (i.e., the anchor point A 122A) and a current anchor position of the position indicator 134 (i.e., the anchor point B 122B) (block 306). The anchor point detection module 204 provides the anchor points 122 to a reference point selection module 206.

The reference point selection module 202 selects reference points along the reference curve 126 (block 308). FIG. 5 describes an example algorithm 500 performed by the reference point selection module 206 to select the reference points. The reference point selection module 206 receives the anchor points 122 from the anchor point detection module 204 (block 502). The reference point selection module 206 then finds reference points 208 (504). In particular, the reference point selection module 206 finds reference point R1 208A that is nearest to the anchor point A 122A and a reference point R2 208B that is nearest to the anchor point B 122B. This is done by traversing t-values in the reference curve 126 and finding the nearest point to the point in consideration. For example, the reference point selection module 206 traverses t-values in the reference curve 126 to find the reference point R1 208A that is nearest to the anchor point A 122A and to find the reference point R2 208B that is nearest to the anchor point B 122B. If the reference point R1 208A is after the reference point R2 208B in the reference curve 126 and the reference curve 126 is open, the reference point R1 208A and the reference point R2 208B are swapped. If the reference curve 126 is closed, the reference curve 126 will be traversed from the reference point R1 208A to the reference point R2 208B.

The reference point selection module 206 also defines distances between the anchor points 122 and the reference points 208 (block 506). The distances can be defined as shown in Equation 3 and Equation 4 below.

$$D1 = D(A, R1) \quad \text{Equation 3}$$

$$D2 = D(B, R2) \quad \text{Equation 4}$$

Returning to FIGS. 2A and 3, the reference point selection module 206 then provides the reference points 208 and the distances D1, D2 to a resultant curve determination module 210. The resultant curve determination module 210 calculates the resultant curve 132 (block 310). FIG. 6 describes an example algorithm 600 performed by the resultant curve determination module 210 to calculate the resultant curve 132. In particular, the resultant curve determination module 210 determines a reference fidelity parameter n (block 602). The reference fidelity number is equal to the number of points to be evaluated. The higher the reference fidelity number is, the closer the resultant curve determination module 210 can imitate the trajectory of the reference curve 126.

The resultant curve determination module 210 also defines a length of the reference curve 126 between the reference point R1 208A and the reference point R2 208B (block 604). This length can be defined as shown in Equation 5 below.

$$L = PathLength(R1, R2), \text{ where } L <= TotalLength \quad \text{Equation 5}$$

Using L and the distances D1, D2 defined above, the resultant curve determination module 210 can then define a step offset (block 606) and a step interval (block 608). The step offset can be defined as shown in Equation 6 below. The step interval can be defined as shown in Equation 7 below.

$$stepOffset = (D2 - D1)/L \quad \text{Equation 6}$$

$$stepInterval = L/n \quad \text{Equation 7}$$

The resultant curve determination module 210 then executes a vector path trajectory imitation algorithm to calculate the resultant curve 132. Turning briefly to FIG. 7, an algorithm 700 is provided as an example of the vector path trajectory imitation algorithm used to calculate the resultant curve 132. The algorithm 700 uses the distances D1, D2, the step offset, and the step interval to return a vector of paired points. Each pair corresponds to a point on the reference curve 126 and a point on the resultant curve 132.

Returning to FIGS. 2A and 3, the resultant curve determination module 210 outputs the resultant curve 132 to the content processing system 104 for further processing (block 312). For example, the content processing system 104 can present the resultant curve 132 in the user interface 110 for the user to use as-is in the creation of their artwork or can be further manipulated such as by changing various parameters (e.g., color, line thickness, etc.) governing the look of the resultant curve 132.

The resultant curve 132 as output from the resultant curve determination module 210 may be suitable for the user as-is. In some cases, however, the resultant curve 132 may exhibit characteristics that are undesirable to the user. For example, the resultant curve 132 may have undesirable curvatures that do not follow the trajectory of the reference curve 126 as closely as the user desires. The vector path trajectory imitation system 136 can implement one or more curve refinement algorithms to refine the curvature of the resultant curve 132 (block 314). These curve refinement algorithms will be described in greater detail with reference to FIGS. 2B, 8, 10A, 10B, 12A, and 12B.

FIG. 2B depicts a system 200B in an example implementation showing further operation of the vector path trajectory imitation system 136 of FIG. 1 in greater detail. To begin, a corner handling module 212 receives the resultant curve 132 from the resultant curve determination module 210 (shown in FIG. 2A). If any anchor point 122 is a corner, the vector path trajectory imitation system 136 can implement the corner handling module 212 to calculate a corner offset distance to replace the offset distance in the algorithm 700 shown in FIG. 7. FIG. 8 provides additional details for handling corners.

FIG. 8 depicts an algorithm 800 performed by the corner handling module 212 to calculate the corner offset distance. Apart from traversing the reference curve 126 from reference point R1 208A to reference point R2 208B as described above, the vector path trajectory imitation system 136 also processes, via the corner handling module 212, constituent anchor points on the reference curve 126 (block 802). The constituent anchor points may or may not lie on a multiple of the step interval from the reference point R1 208A. If a constituent anchor point is determined to be a corner (block 804), then the vector path trajectory imitation system 136 is not capable of calculating a normal over the anchor point. To aid in such cases, the corner handling module 212 bisects the anchor point based on the neighboring angle that the anchor point makes with associated in and out tangents (block 806). A candidate curve point lies on this angle bisector at a distance calculated in a similar fashion as the offset distance calculation provided in FIG. 7. For a given anchor point that is a corner, the corner handling module 212 calculates a corner offset distance (block 808) to replace the offset distance in the algorithm 700 depicted in FIG. 7. Equation 8 below can be used to calculate the offset distance, where AP is the anchor point under consideration.

$$OffsetDistance_{corner} = D1 + stepOffset * D(R1, AP) \quad \text{Equation 8}$$

The corner offset distance can then be used in execution of the vector path trajectory imitation algorithm, such as the algorithm 700 shown in FIG. 7.

Figure 9:
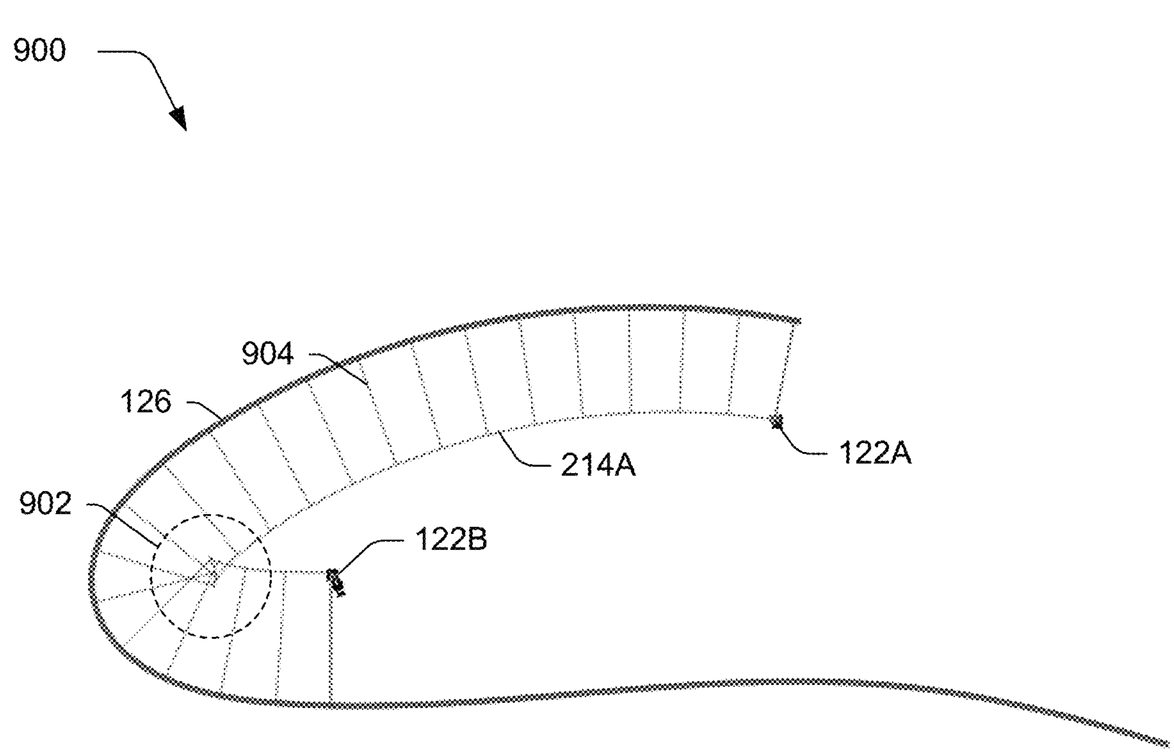
FIG. 9 is an illustration of an example output of the vector path trajectory imitation system in which a resultant curve has an unintentional loop artifact.

Returning to FIG. 2B, the output of the corner handling module 212 is shown as a refined resultant curve 214A. The refined resultant curve 214A is the resultant curve 132 after it is processed by the corner handling module 212. In some cases, the refined resultant curve 214A still exhibits undesirable characteristics. For example, as can be seen in FIG. 9, an example output 900 is shown in which the refined resultant curve 214A between the anchor points 122 has been drawn resulting in an unintentional loop artifact 902. The unintentional loop artifact 902 can be removed through further curve refinement algorithms described below. The output 900 shows the reference curve 126 that the refined resultant curve 214A is attempting to imitate, along with curvature combs 904 that represent the normals from the reference curve 126 with lengths equal to the offset distance (or corner offset distance as the case may be) in the algorithm 700.

A nearest neighbor module 216 can receive the refined resultant curve 214A from the corner handling module 212. Alternatively, when no anchor points are on corners, the resultant curve 132 can be provided as-is to the nearest neighbor module 216 for further processing.

Figure 10A:
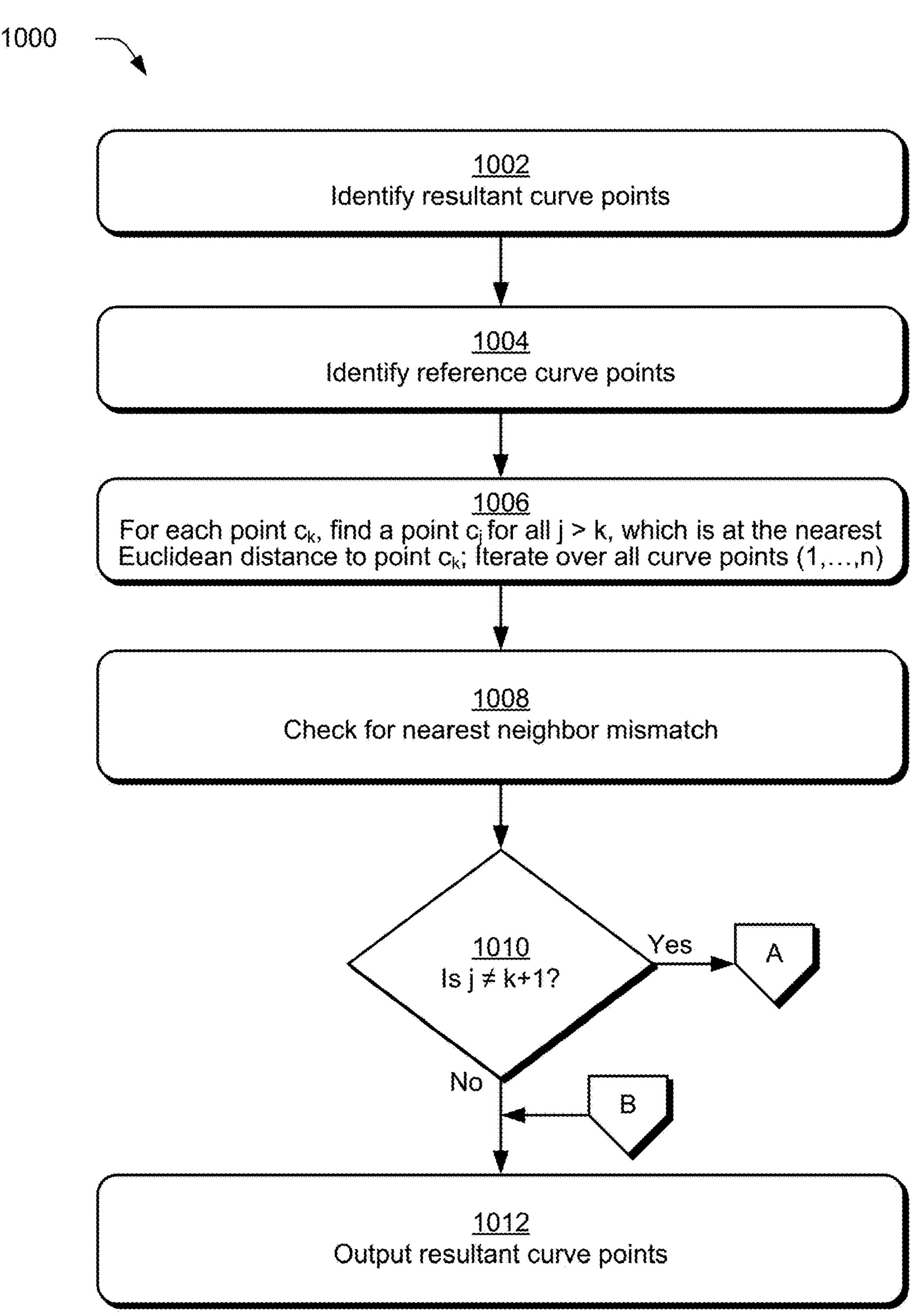

FIGS. 10A, 10B depict an algorithm 1000 that can be performed by the nearest neighbor module 216 to refine the curvature of the resultant curve 132 or to further refine the curvature of the refined resultant curve 214A. The algorithm 1000 will be described in context of refining the resultant curve 132.

As mentioned above, while collecting candidate curve points using the algorithm 700, unintentional loops can be created. An example of this is shown as the unintentional loop artifact 902 in FIG. 9. The algorithm 1000 uses a nearest neighbor concept to eliminate or at least mitigate unintentional loop artifacts.

The nearest neighbor module 216 first identifies two sets of points-one set of curve points ($c_i$) representing the resultant curve 132 (block 1002) and one set of reference points ($r_i$) representing the reference curve 126 (block 1004). Additionally, indices, k and j, are initially set to 1.

For each point $c_k$ in the resultant curve 132, the nearest neighbor module 216 finds a point $c_j$ on the reference curve 126 that is nearest to $c_k$ in terms of the Euclidean distance (block 1006). This is repeated for all curve points $c_i$ in the resultant curve 132. The nearest neighbor module 216 then checks for a nearest neighbor mismatch (block 1008). In particular, if j is not equal to k+1, the nearest neighbor module 216 determines (block 1010) that $c_k+1$ is not the closest point to $c_k$ and the algorithm 1000 continues in FIG. 10B. Otherwise, the nearest neighbor module 216 outputs the resultant curve points to refine the resultant curve 132 (block 1012).

Turning to FIG. 10B, the nearest neighbor module 216 calculates the distance D1 between two points $c_{k+1}$ and $r_{k+1}$ (where k is the current index) and keeps distance D2 the same (block 1014). The nearest neighbor module 216 then sets $R1=r_j$, which is the point on the reference curve 126 that is currently closest to $c_k$ (block 1016). The nearest neighbor module 216 recalculates the step offset, which is the difference between D2 (the initial distance between $c_k$ and $r_j$) and D1, divided by the number of remaining points between j and n (block 1018). The step offset is usable to adjust the distances for the remaining points in the resultant curve 132.

For each of the points in the resultant curve 132 between j and n, the nearest neighbor module 216 recalculates the distances and positions based on the new values of D1, R1 and the step offset (block 1020). This recalculation operates to shift these points closer to $c_{k+1}$ on the reference curve 126.

Finally, the nearest neighbor module 216 discards each of the points in the resultant curve 132 that are between k+1 and j−1. These points are no longer considered part of the resultant curve 132. The algorithm 700 returns to FIG. 10A, and the nearest neighbor module 216 outputs the resultant curve points to refine the resultant curve 132 (block 1012).

Figure 11:
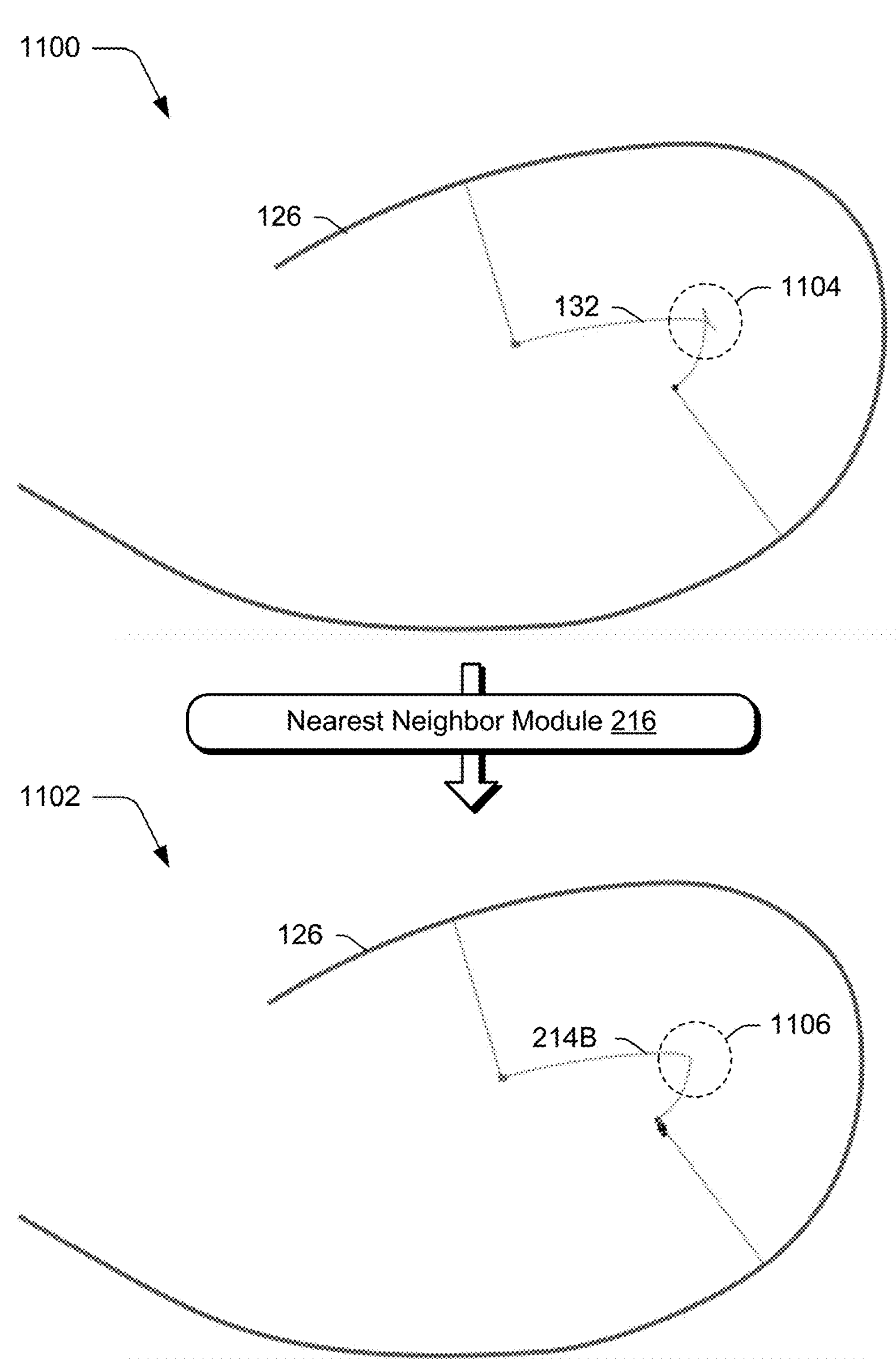
FIG. 11 is an illustration of an example pre-nearest-neighbor output and an example post-nearest-neighbor output of the vector path trajectory imitation system.

This procedure enables the vector path trajectory imitation system 136 to iteratively adjust points in the resultant curve 132 to enforce a curvature of the resultant curve 132 that increasingly corresponds to a curvature of the reference curve 126. FIG. 11 illustrates an example of this correspondence.

FIG. 11 depicts a pre-nearest-neighbor output 1100 and a post-nearest-neighbor output 1102 of the vector path trajectory imitation system 136. The pre-nearest-neighbor output 1100 shows an example of the resultant curve 132 as output by the resultant curve determination module 210. The post-nearest-neighbor output 1102 shows the refined resultant curve 214B after the nearest neighbor module 216 refines the curvature of the resultant curve 132 according to the algorithm 1000 described above with reference to FIGS. 10A, 10B. Notably, the pre-nearest-neighbor output 1100 contains an unintentional loop artifact 1104 on the resultant curve 132. The nearest neighbor module 216 refines the resultant curve 132 remove the unintentional loop artifact 1104 as shown at 1106.

Although the nearest neighbor module 216 is configured to solve a variety of unintentional loop artifact, unintentional loop artifacts may still remain after refining the resultant curve 132 using a nearest neighbor operation. To refine the resultant curve 132 further, the vector path trajectory imitation system 136 can employ another curve refining algorithm, an example of which is described in the following discussion and shown in corresponding figures.

Figure 12A:
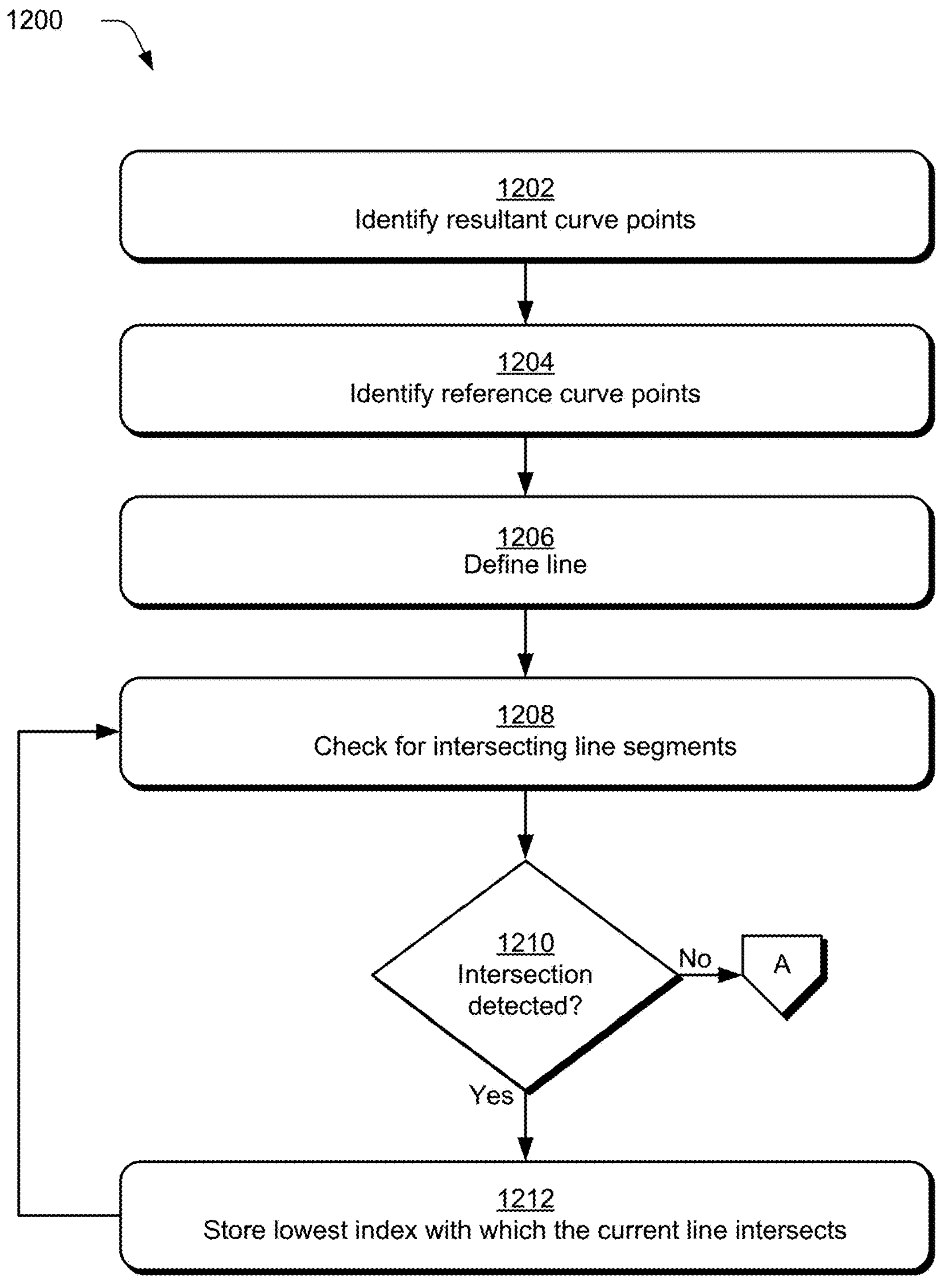
FIGS. 12A, 12B are a flow diagram depicting a step-by-step procedure in an example implementation of operations performable by a processing device for accomplishing a result of refining an output of a nearest neighbor module to mitigate or eliminate remaining unintentional loop artifacts.
Figure 12B:
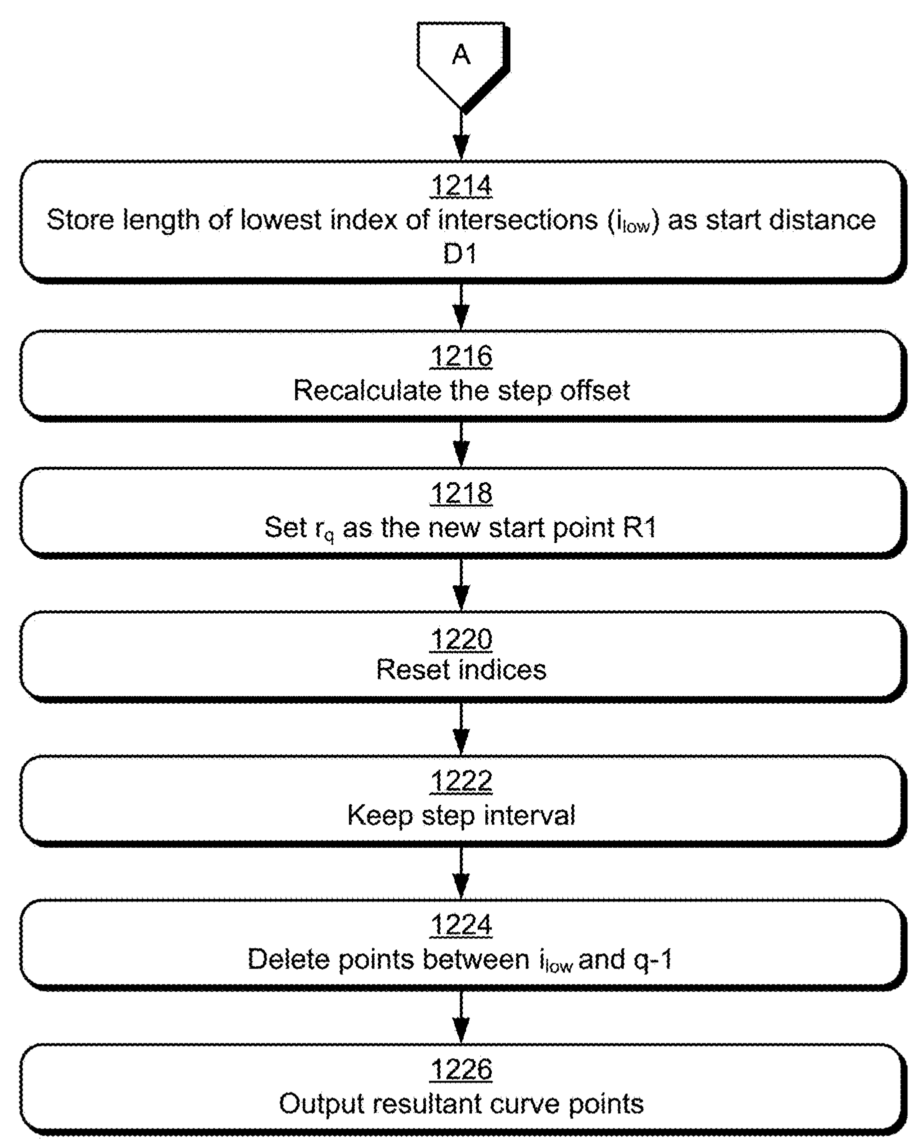

FIGS. 12A, 12B depict an algorithm 1200 that is performable by the intersection detection module 218 to refine the curvature of a resultant curve 132 or to further refine the curvature of a refined resultant curve 214B. The algorithm 1200 is described in context of further refining the refined resultant curve 214B output by the nearest neighbor module 216. The algorithm 1200 ensures that the refined resultant curve 214B does not intersect itself and continues to follow the trajectory of the reference curve 126.

The intersection detection module 218 first identifies two sets of points-one set of curve points "c" representing points along the refined resultant curve 214B (block 1202) and one set of reference points representing points along the reference curve 126 ($r_i$) (block 1204) for each of "$1 \leq i \leq n$." The intersection detection module 218 also defines a line "$l_i$" formed between "$c_i$" and "$r_i$" (block 1206).

For a given point "$c_k$," the intersection detection module 218 checks if the line segment "$l_k$" intersects with one or more of the line segments "$l_j$" for each "j<k" (block 1208). The intersection detection module 218 iterates overs each of the line segments "(1, . . . , n)" and determines when an intersection is detected (block 1210). When an intersection is detected (block 1210), the intersection detection module 218 stores the lowest index with which the current line intersects (block 1212). The lowest index is defined as "$i_{low}$." The index of the current line is defined as "m." The algorithm 1200 repeats block 1208 starting from index "m+1" until the intersection detection module 218 detects a line segment which does not intersect one or more of the line segments before it (block 1210). The index of this non-intersecting line segment is defined as "q." The algorithm 1200 then proceeds to FIG. 12B.

The intersection detection module 218 stores the length of the line segment "$l_{ilow}$." as the start distance "D1" (block 1214). The intersection detection module 218 then recalculates the step offset (1216) according to Equation 9 below, where "L'" is the remaining length of the reference curve 126 to be traversed.

$$stepOffset = (D2 - D1)/L' \qquad \text{Equation 9}$$

The intersection detection module 218 sets "$r_g$" as the new start point "R1" (block 1218) and resets the indices "i" to one and "n" to the remaining points to be evaluated (block 1220). The intersection detection module 218 keeps the step interval the same to ensure that the resultant curve points are at the same step distance (block 1222). The intersection detection module 218 then deletes the points between "$i_{low}$" and "q−1" (block 1224) and outputs the resultant curve points to further refine the refined resultant curve 214B (block 1226).

If normal lines are not intersecting but are near each other because of the curvature of the reference curve 126, unintentional looping artifacts can be observed. When used together, the nearest neighbor module 216 and the intersection detection module 218 complement each other to better imitate the trajectory of the reference curve 126.

Figure 13:
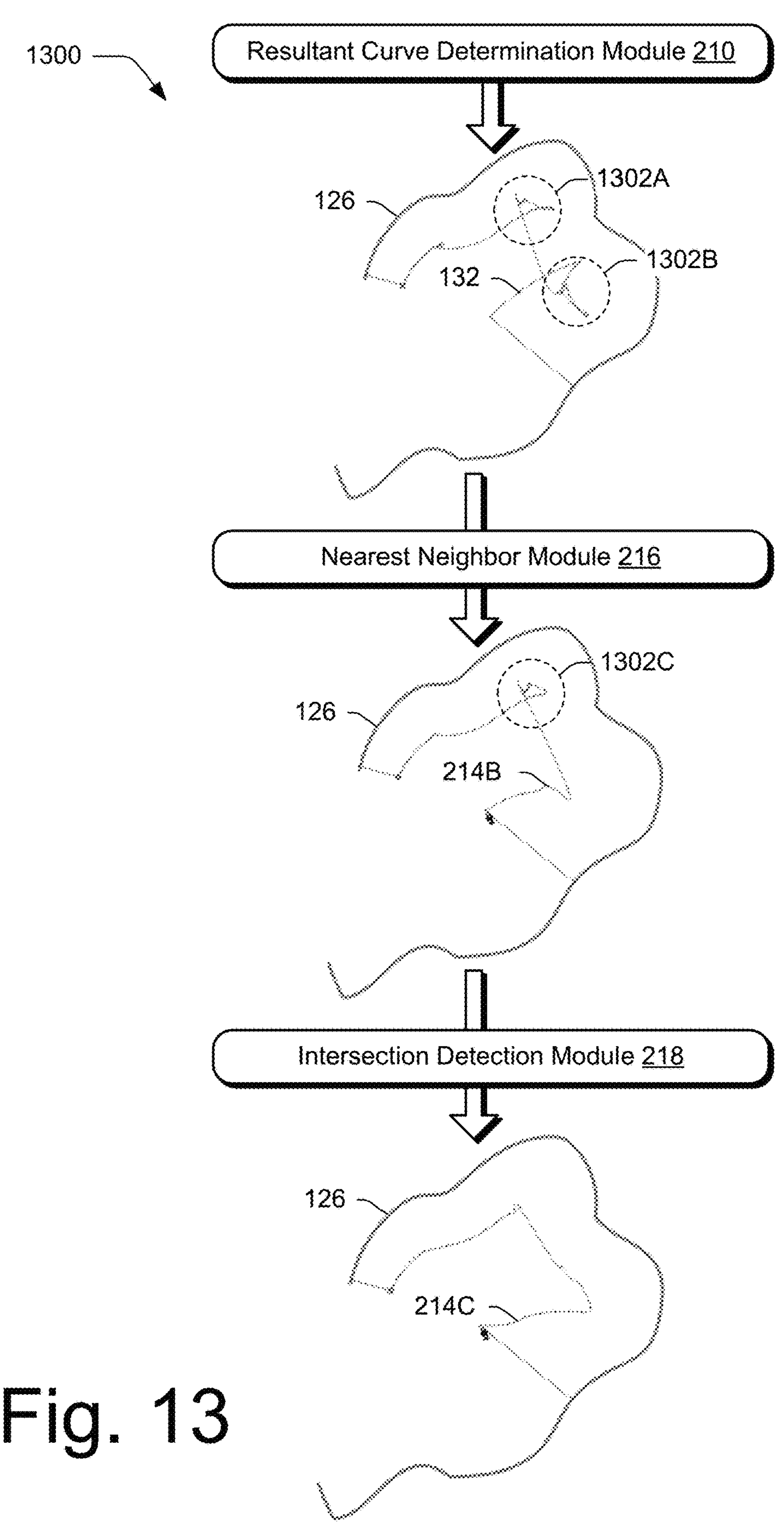
FIG. 13 is an illustration of how a nearest neighbor module and an intersection detection module can refine an output of a resultant curve determination module to mitigate or eliminate unintentional loop artifacts.

FIG. 13 illustrates how the nearest neighbor module 216 and the intersection detection module 218 refine the output of the resultant curve determination module 210 to eliminate unintentional looping artifacts. In particular, the resultant curve 132 as output by the resultant curve determination module 210 shows unintentional loop artifacts 1302A, 1302B. The resultant curve 132 with the unintentional loop artifacts 1302A, 1302B can be provided to the nearest neighbor module 216 which removes the second unintentional loop artifact 1302B and refines the first unintentional loop artifact 1302A to create the refined resultant curve 214B. To remove the first unintentional loop artifact 1302A, the nearest neighbor module 216 provides the refined resultant curve 214B to the intersection detection module 218, which removes the first unintentional loop artifact 1302A to create the refined resultant curve 214C.

For cases where two given points lie on opposite sides of the reference curve 126, the resultant curve 132 should intersect the reference curve 126 at some point so that resultant curve 132 reaches from point "A→B" following the trajectory from "R1→R2." In such cases, a relevant intersection point (IP) between the reference curve 126 and the resultant curve 132 can be determined and the vector path trajectory imitation algorithm (e.g., the algorithm 700) can be divided into two parts: (1) the offset distance from "D1→0;" and (2) the offset distance from "0→D2."

Figure 14:
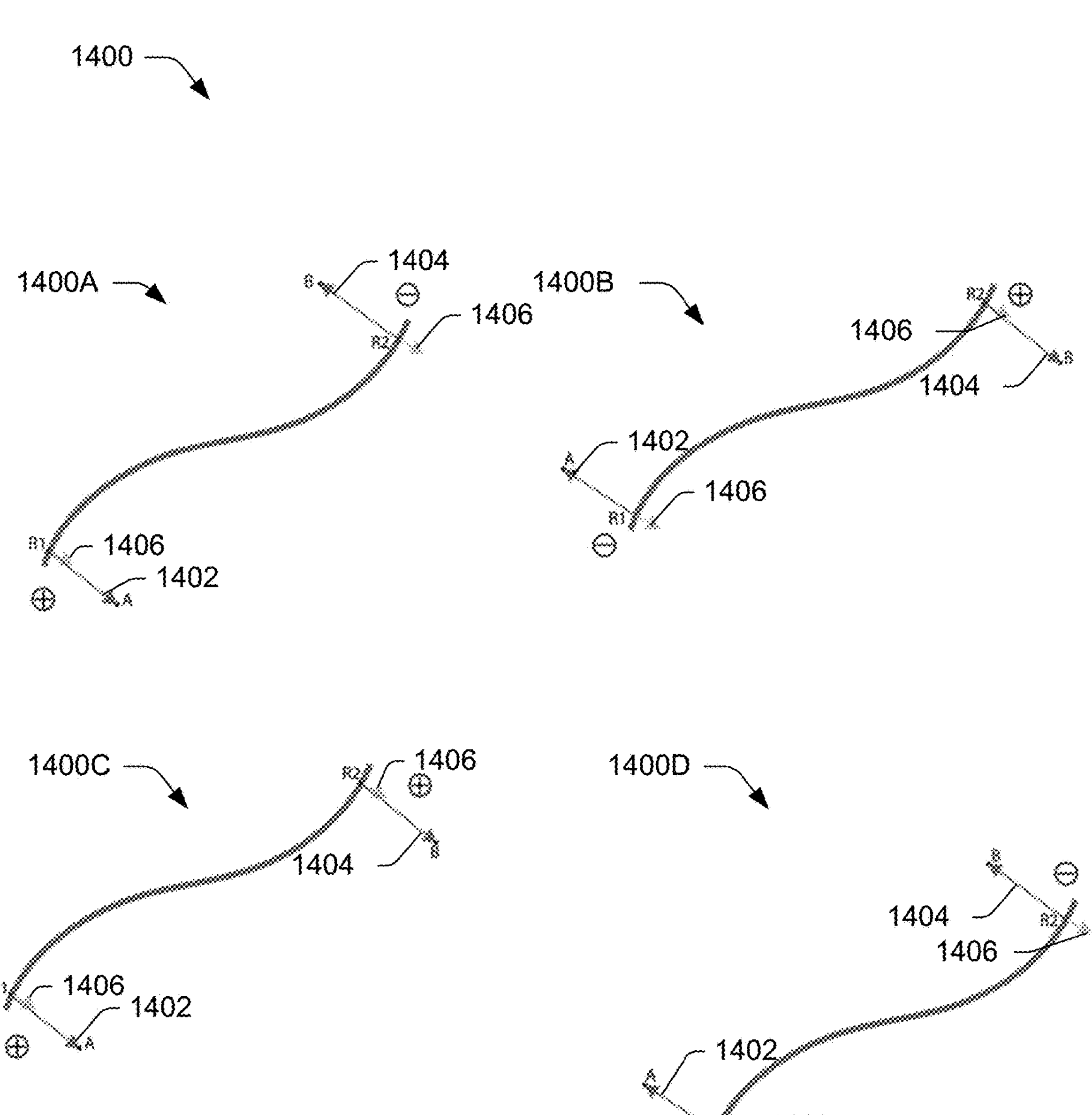
FIG. 14 is an illustration of several example intersection scenarios.

Referring to FIG. 14, several intersection scenarios 1400A-1400D are shown. The intersection scenarios can be detected by a intersection detection module 218 (shown in FIG. 2B). Each of the intersection scenarios 1400 shows start vectors "$\overrightarrow{AR_1}$" 1402 and end vectors "$\overrightarrow{BR_2}$" 1404 (collectively "GV vectors"). Normal unit vectors ("NU vectors") 1406 at points "R1 ($\hat{N}1$)" and "R2 ($\hat{N}2$)" are also shown. If the direction of the normal unit vectors 1406 and the GV vectors 1402, 1404 is the same, the intersection scenario 1400 is denoted with a "+" sign, otherwise, the intersection scenario 1400 is denoted with a "−" sign. Equation 10 is an example equation for detecting such intersection scenarios.

$$\left(\overrightarrow{AR_1}\cdot\hat{N}1\right)*\left(\overrightarrow{BR_2}\cdot\hat{N}2\right)\geq 0,\ \text{no intersection scenario} \quad \text{Equation 10}$$

$$\left(\overrightarrow{AR_1}\cdot\hat{N}1\right)*\left(\overrightarrow{BR_2}\cdot\hat{N}2\right)< 0,\ \text{intersection scenario}$$

Figure 15:
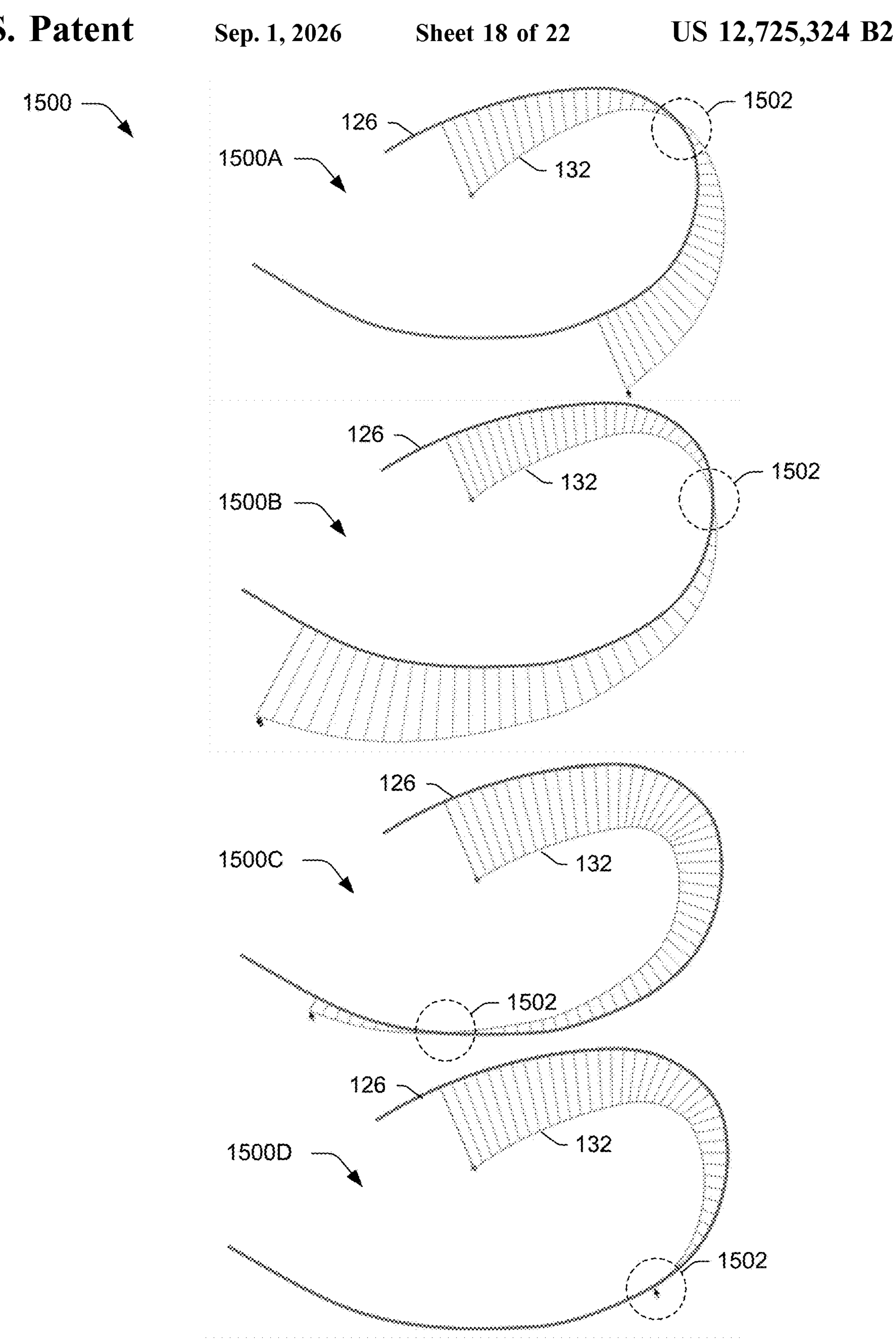
FIG. 15 is an illustration of different example scenarios depicting a situation in which a reference curve and a resultant curve cross at an intersection point.

FIG. 15 shows different scenarios 1500A-1500D depicting the situation in which the reference curve 126 and the resultant curve 132 cross at an IP 1502. The strategy of detecting the IP 1502 is derived from properties of similar triangles where the ratio of all corresponding sides should be equal. Using this strategy, if "D1=D2," the IP 1502 lies in the middle of the path between "R1" and "R2." Equation 11 and Equation 12 demonstrates this scenario.

$$\frac{D1}{D2}=\frac{PathLength(R1,\,IP)}{PathLength(IP,\,R2)} \quad \text{Equation 11}$$

-continued $$PathLength(R1,\,IP)=L*\frac{D1}{D1+D2} \quad \text{Equation 12}$$

Figure 16:
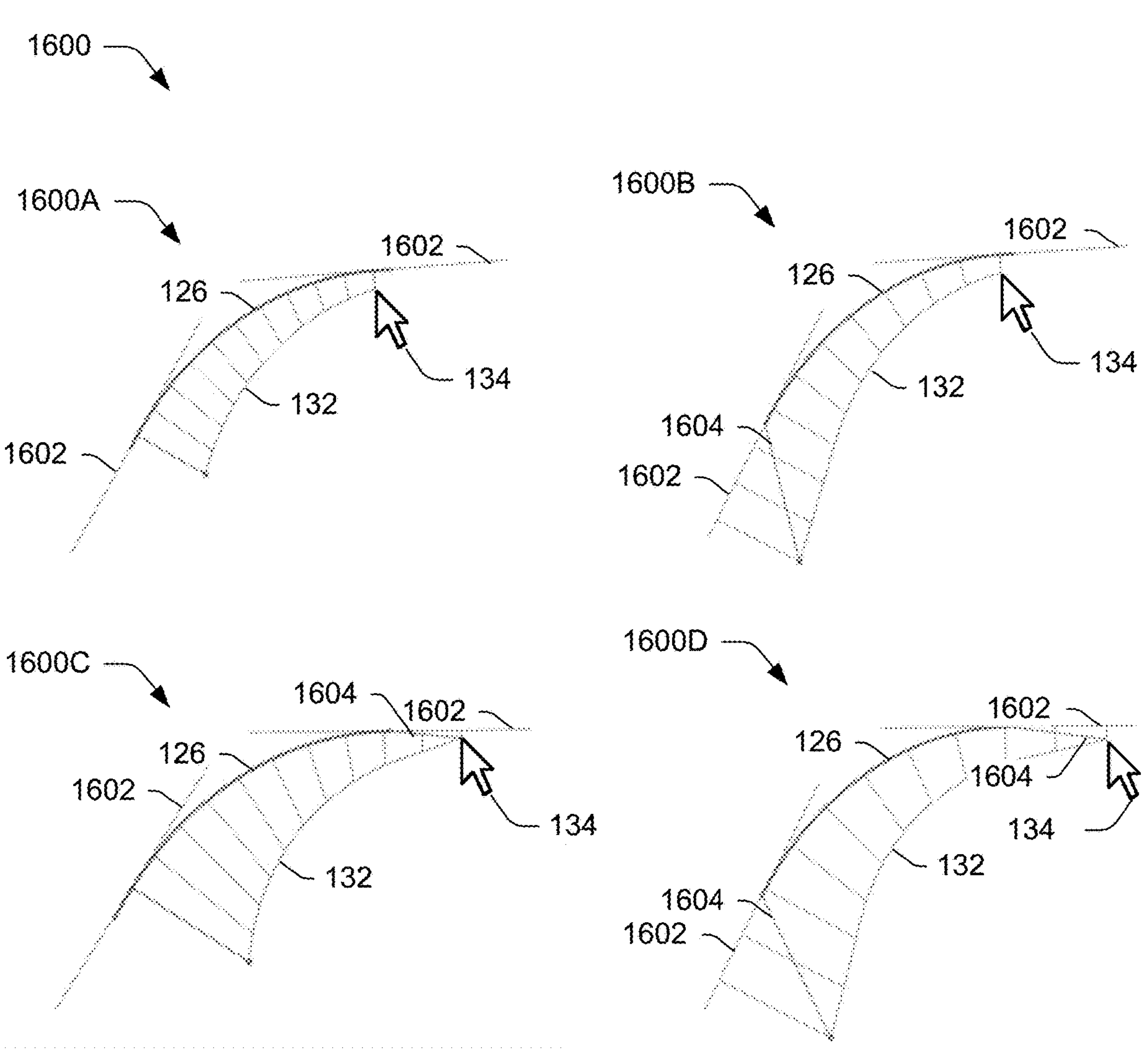
FIG. 16 is an illustration of different example scenarios depicting reference curve extension performed by the vector path trajectory imitation system.

FIG. 16 shows different scenarios 1600A-1600D depicting reference curve extension. There may be cases when a user taps or hovers the position indicator 134 beyond the reference curve 126 end points. More specifically, it is either not possible in one or more examples to create a normal vector from the reference curve 126 passing through point "B" or the shortest perpendicular passing through point "B" is obtained when it is created from a tangent line 1602 at "R2." Similar situations happen when point "A" is located outside the confines of the reference curve 126. The vector path trajectory imitation system 136, via a reference extension module 220, can extend the reference curve 126 along tangent lines 1602 at the end points to create an extended portion 1604. The resultant curve 132 can continue to follow the extended portion 1604.

Thus far, the vector path trajectory imitation system 136 obtains a set of points on the Euclidean plane through which the vector path trajectory imitation system 136 can fit, via a curve fitting module 222 (shown in FIG. 2B), a resultant curve 132 (combination of cubic Bézier curves). There are several algorithms that can be implemented by the curve fitting module 222. For example, the Cornucopia algorithm used by Adobe® Illustrator® is capable of achieving smooth curves. This algorithm produces best-in-class vector path creation with a given set of points and can be implemented with the techniques described herein.

The techniques described herein provide the capability to extend a current path while maintaining different types of continuities, such as position continuity (G0) and tangential continuity (G1). In case a choice is made to maintain tangential (G1) continuity, the following procedure can be used. Suppose "C={$C_1$, $C_2$, . . . , $C_n$}" are anchor points on the current curve and the algorithm has produced "P={$P_1$, $P_2$, . . . , $P_k$}" resultant curve points. To achieve G1 continuity between "(" and the curve to be obtained from "P," the vector path trajectory imitation system 136, via a continuity module 224, prepends "P" with the in-tangent of anchor "$C_n$" and position of anchor "$C_n$" Thus, the final set of input points for curve fitting are:

$$\{C_n\cdot\text{in-tangent},\ C_n\cdot\text{position},\ P_1,\ P_2,\ \ldots\ ,\ P_k\}.$$

The resultant curve obtained after curve fitting is then split at "$C_n$.position" and the left portion is discarded. The right portion of the curve is appended to the current curve "{$C_1$, $C_2$, . . . , $C_n$}."

Figure 17:
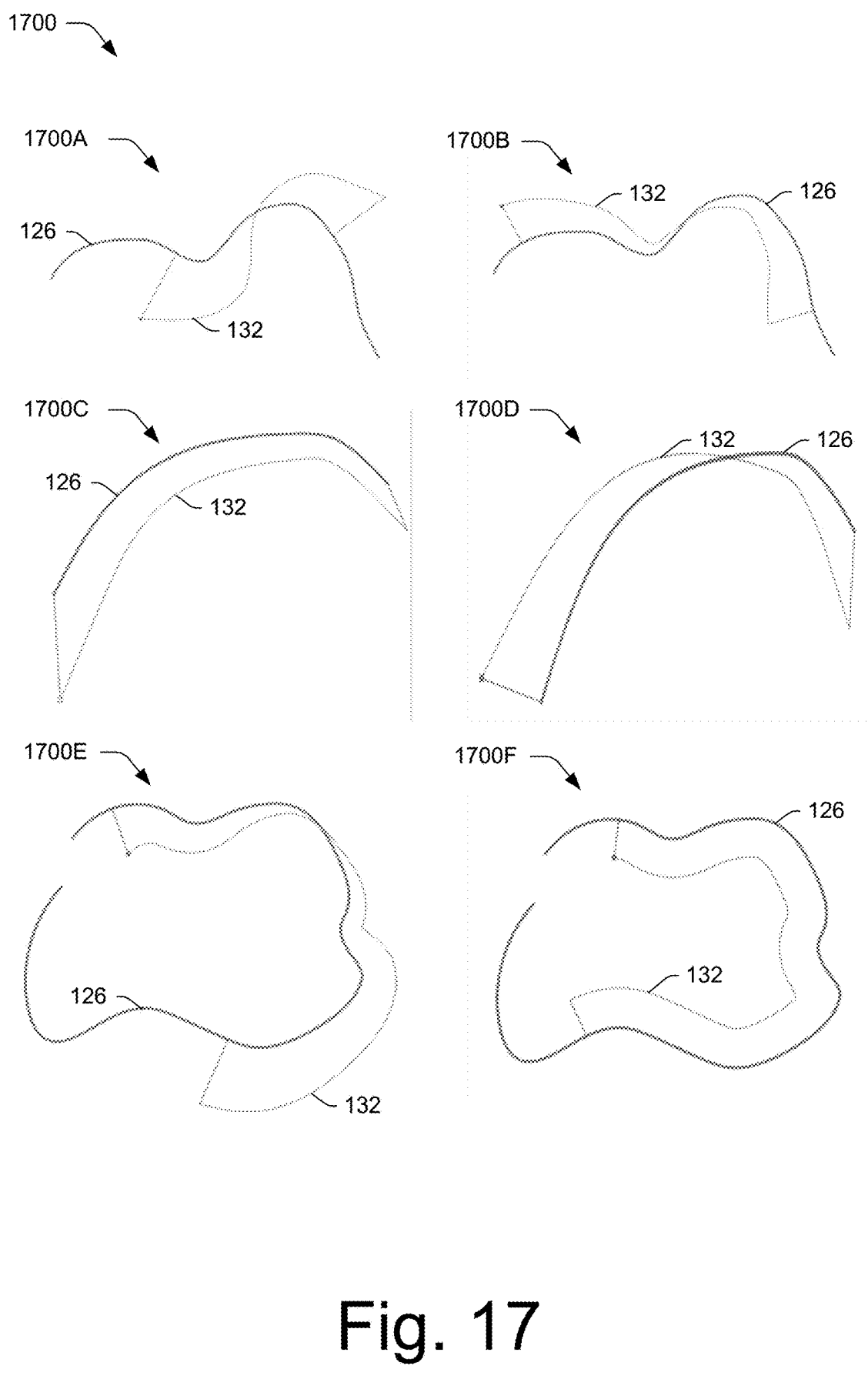
Figure 18:
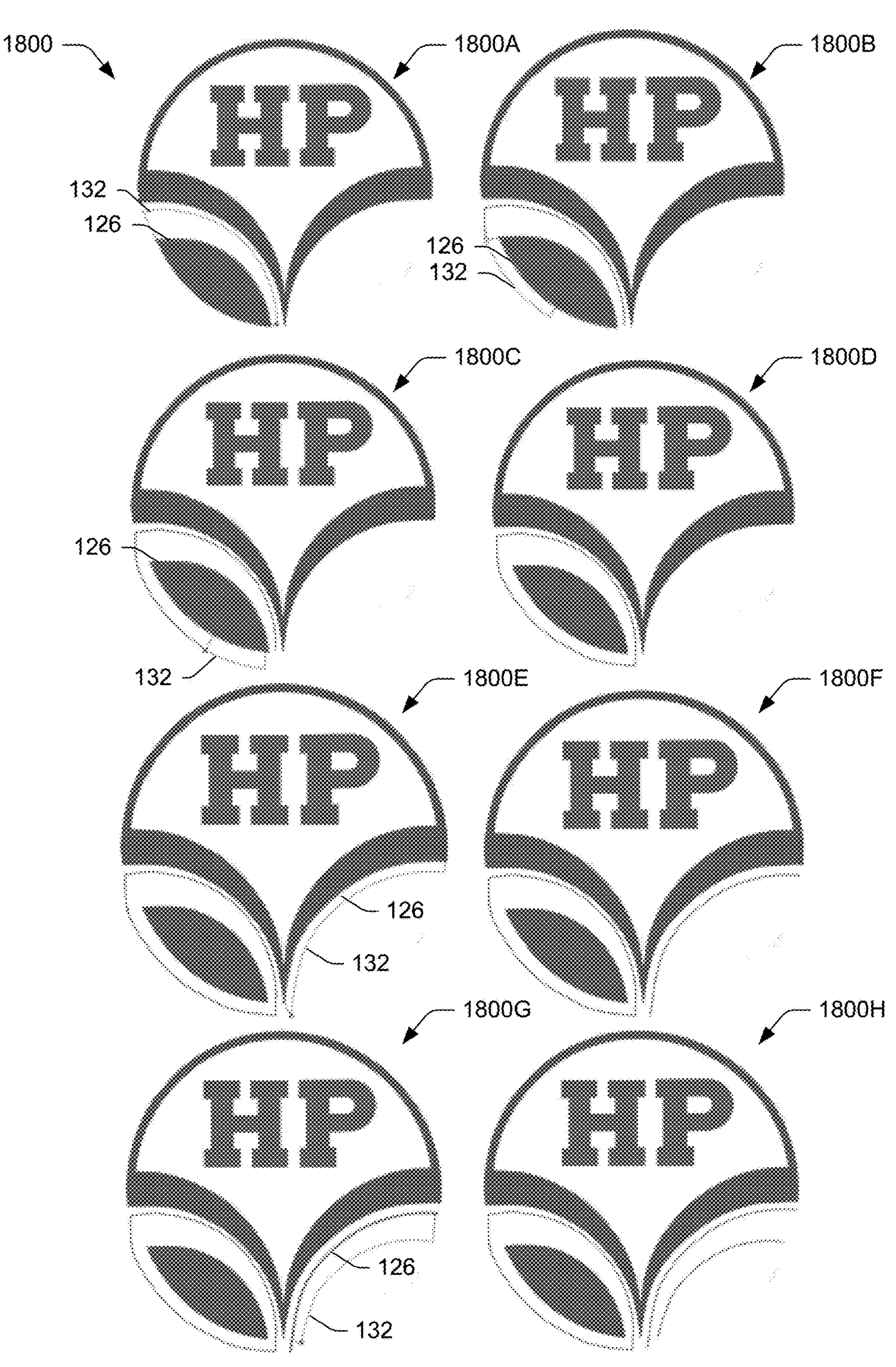
FIG. 18 is an illustration of an example logo created using the vector path trajectory imitation system.

FIGS. 17 and 18 shows several examples of how the vector path trajectory imitation system 136 is usable create new vector paths that imitate the trajectories of other existing vector paths. In FIG. 17, example curves 1700A-1700F illustrate different reference curves 156 and different resultant curves 132 that can be created using the techniques and systems described herein. In FIG. 18, example logos 1800A-1800F illustrate how curves of an existing artwork, such as a logo, can be selected as reference curves 156 to be used to create resultant curves 132 to efficiently complete a design. These examples are merely exemplary and are provided to exhibit the flexibility of the techniques and systems described herein to apply to different trajectories, including multiple trajectories along a single reference curve 126, while avoiding unintentional loop artifacts and handling intersecting segments.

Example System and Device

Figure 19:
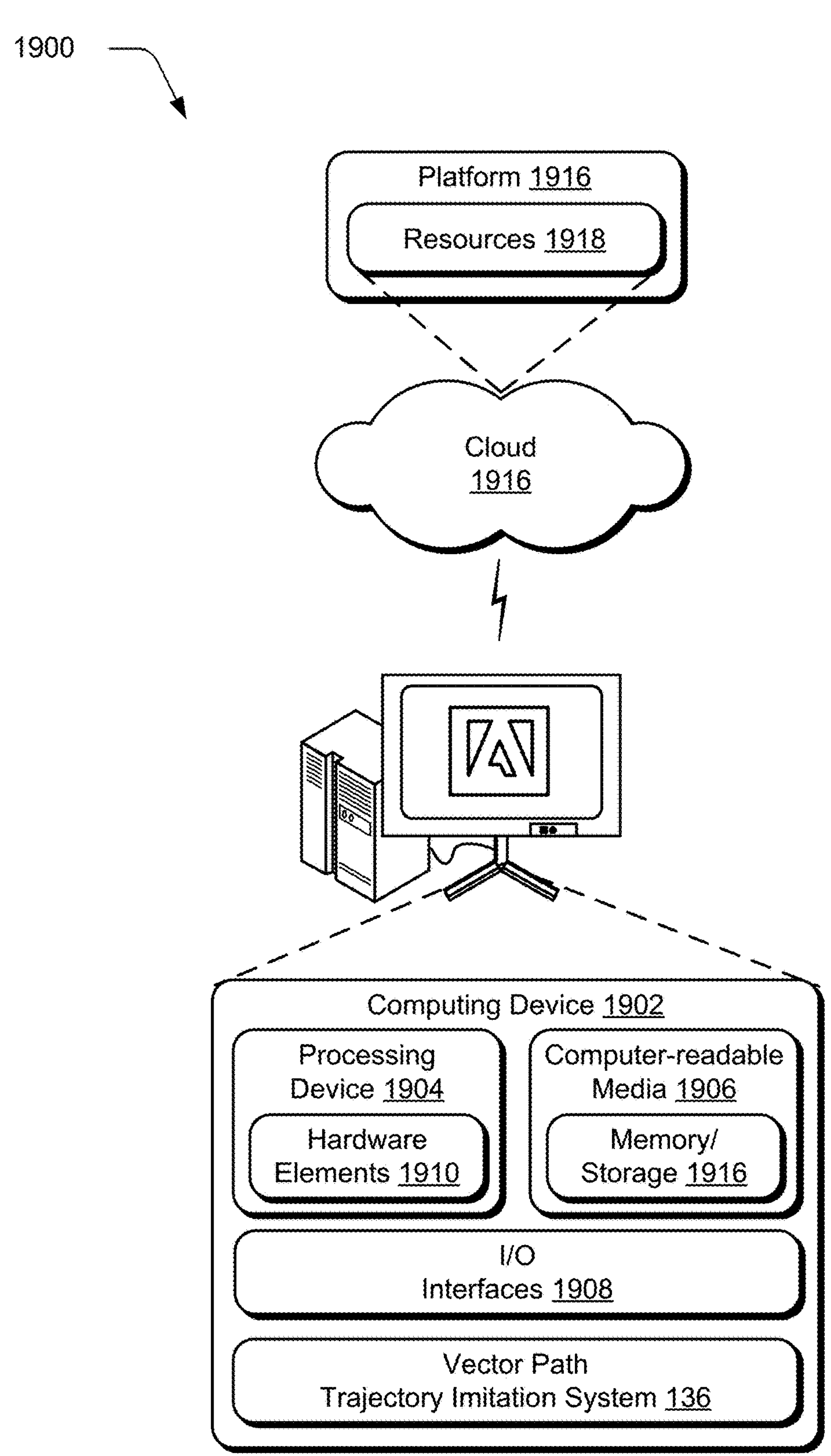
FIG. 19 illustrates an example system including various components of an example device that can be implemented as any type of computing device as described and/or utilize with reference to FIGS. 1-18 to implement embodiments of the techniques described herein.

FIG. 19 illustrates an example system generally at 1900 that includes an example computing device 1902 that is representative of one or more computing systems and/or devices that implement the various techniques described herein. The computing device 1902 is configurable, for example, as a server of a service provider, a device associated with a client (e.g., a client device), an on-chip system, and/or any other suitable computing device or computing system.

The example computing device 1902 as illustrated includes a processing device 1904, one or more computer-readable media 1906, and one or more I/O interface 1908 that are communicatively coupled, one to another. Although not shown, the computing device 1902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1904 is representative of functionality to perform one or more operations using hardware. Accordingly, the processing device 1904 is illustrated as including hardware element 1910 that is configurable as processors, functional blocks, and so forth. This includes implementation in hardware as an application specific integrated circuit or other logic device formed using one or more semiconductors. The hardware elements 1910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically executable instructions.

The computer-readable storage media 1906 is illustrated as including memory/storage 1912 that stores instructions that are executable to cause the processing device 1904 to perform operations. The memory/storage 1912 represents memory/storage capacity associated with one or more computer-readable media. The memory/storage 1912 includes volatile media (such as random access memory (RAM)) and/or nonvolatile media (such as read only memory (ROM), Flash memory, optical disks, magnetic disks, and so forth). The memory/storage 1912 includes fixed media (e.g., RAM, ROM, a fixed hard drive, and so on) as well as removable media (e.g., Flash memory, a removable hard drive, an optical disc, and so forth). The computer-readable media 1906 is configurable in a variety of other ways as further described below.

Input/output interface(s) 1908 are representative of functionality to allow a user to enter commands and information to computing device 1902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1910 and computer-readable media 1906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1910. The computing device 1902 is configured to implement particular instructions and/or functions corresponding to the software and/or hardware modules. Accordingly, implementation of a module that is executable by the computing device 1902 as software is achieved at least partially in hardware, e.g., through use of computer-readable storage media and/or hardware elements 1910 of the processing device 1904. The instructions and/or functions are executable/operable by one or more articles of manufacture (for example, one or more computing devices 1902 and/or processing devices 1904) to implement techniques, modules, and examples described herein.

The techniques described herein are supported by various configurations of the computing device 1902 and are not limited to the specific examples of the techniques described herein. This functionality is also implementable all or in part through use of a distributed system, such as over a "cloud" 1914 via a platform 1916 as described below.

The cloud 1914 includes and/or is representative of a platform 1916 for resources 1918. The platform 1916 abstracts underlying functionality of hardware (e.g., servers) and software resources of the cloud 1914. The resources 1918 include applications and/or data that can be utilized while computer processing is executed on servers that are remote from the computing device 1902. Resources 1918 can also include services provided over the Internet and/or through a subscriber network, such as a cellular or Wi-Fi network.

The platform 1916 abstracts resources and functions to connect the computing device 1902 with other computing devices. The platform 1916 also serves to abstract scaling of resources to provide a corresponding level of scale to encountered demand for the resources 1918 that are implemented via the platform 1916. Accordingly, in an interconnected device embodiment, implementation of functionality described herein is distributable throughout the system 1900. For example, the functionality is implementable in part on the computing device 1902 as well as via the platform 1916 that abstracts the functionality of the cloud 1914.

In implementations, the platform 1916 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, a selection of a reference curve from one or more vector paths displayed in a user interface;

receiving, by the processing device, an input via the user interface defining a path in the user interface;

selecting, by the processing device, reference points along the reference curve based on the path;

calculating, by the processing device, a resultant curve offset from the reference curve that imitates a trajectory of the reference curve based on the path and the selected reference points along the reference curve; and displaying, by the processing device, the resultant curve in the user interface as offset from the reference curve.

2. The method as described in claim 1, wherein the resultant curve extends the reference curve in the user interface.

3. The method as described in claim 1, wherein the resultant curve replaces the path in the user interface.

4. The method as described in claim 3, wherein the receiving the path includes identifying a last anchor position as a first anchor point and a current anchor position of a position indicator as a second anchor point.

5. The method as described in claim 4, wherein selecting the reference points along the reference curve comprises:

receiving the first anchor point and the second anchor point;

finding a first reference point nearest the first anchor point;

finding a second reference point nearest the second anchor point;

defining a first distance between the first anchor point and the first reference point; and defining a second distance between the second anchor point and the second reference point.

6. The method as described in claim 5, wherein the calculating the resultant curve includes calculating the resultant curve based on the first distance, the second distance, the first reference point, and the second reference point.

7. The method as described in claim 5, wherein the calculating the resultant curve further comprises executing a vector path trajectory imitation algorithm based on the first distance, the second distance, the first reference point, and the second reference point.

8. The method as described in claim 1, further comprising refining, by the processing device, the resultant curve.

9. The method as described in claim 8, wherein the refining the resultant curve includes removing a loop artifact.

10. The method as described in claim 8, wherein the refining the resultant curve includes applying a corner handling algorithm to the resultant curve to create a refined resultant curve.

11. The method as described in claim 8, wherein the refining the resultant curve includes applying a nearest neighbor curve refining algorithm to the resultant curve to create a refined resultant curve.

12. The method as described in claim 11, wherein the refining the resultant curve further includes applying an intersection detection algorithm to the refined resultant curve to create a further refined resultant curve.

13. A system comprising:

a processing device; and a computer-readable storage medium storing instructions that, responsive to execution by the processing device, causes the processing device to perform operations including:

identifying a path as a freeform line in a user interface having a first anchor point and a second anchor point;

selecting reference points along one or more vector paths of a reference curve offset from the path based on the first and second anchor points;

calculating a resultant curve offset from the reference curve based on the path, the first and second anchor points, and the selected reference points of the reference curve; and outputting the resultant curve in the user interface as offset from the reference curve.

14. The system as described in claim 13, wherein the resultant curve extends the reference curve.

15. The system as described in claim 13, wherein the resultant curve replaces the path in the user interface.

16. The system as described in claim 13, wherein the operations further comprise applying a corner handling algorithm to the resultant curve to create a refined resultant curve.

17. The system as described in claim 13, wherein the operations further comprise applying a nearest neighbor algorithm to the resultant curve to create a refined resultant curve.

18. The system as described in claim 17, wherein the operations further comprise applying an intersection detection algorithm to the refined resultant curve to create a further refined resultant curve.

19. One or more computer-readable storage media storing instructions that, responsive to execution by a processing device, causes the processing device to perform operations comprising:

selecting a reference curve having a first reference point and a second reference point from one or more vector paths displayed in a user interface;

identifying a path having a first anchor point and a second anchor point as input via the user interface at a location offset from the reference curve;

calculating a resultant curve based on the location of the path in the user interface and a trajectory of the reference curve in the user interface based at least in part on:

determining a length of the reference curve between the first reference point and the second reference point;

determining a first distance between the first anchor point and the first reference point, determining a second distance between the second anchor point and the second reference point; and executing a vector path trajectory imitation algorithm based on the length of the reference curve, the first distance, and the second distance; and outputting the resultant curve in the user interface with the resultant curve as offset from the reference curve based on the location.

20. The one or more computer-readable storage media as described in claim 19, wherein the operations further comprise:

refining the resultant curve to remove an unintentional loop artifact by applying one or more curve refining algorithms, wherein the one or more curve refining algorithms comprise a corner handling algorithm, a nearest neighbor algorithm, and an intersection detection algorithm.

* * * * *